(12) United States Patent
Pihlaja et al.

(10) Patent No.: US 7,508,377 B2
(45) Date of Patent: Mar. 24, 2009

(54) CONTROL AND A CONTROL ARRANGEMENT

(75) Inventors: Pekka Pihlaja, Helsinki (FI); Jari Nousiainen, Espoo (FI); Turo Keski-Jakari, Helsinki (FI)

(73) Assignee: Nokia Corporation, Espoo (FI)

( * ) Notice: Subject to any disclaimer, the term of this patent is extended or adjusted under 35 U.S.C. 154(b) by 701 days.

(21) Appl. No.: 10/794,807

(22) Filed: Mar. 5, 2004

(65) Prior Publication Data

US 2005/0195156 A1    Sep. 8, 2005

(51) Int. Cl.
*G09G 5/08* (2006.01)
(52) U.S. Cl. ................... 345/161; 345/156; 345/162
(58) Field of Classification Search ......... 345/156–169, 345/173–178; 178/18.01–18.07
See application file for complete search history.

(56) References Cited

U.S. PATENT DOCUMENTS

| 5,541,622 | A | 7/1996 | Engle et al. |
| 5,923,318 | A | 7/1999 | Zhai et al. |
| 6,184,867 | B1 * | 2/2001 | Kandogan et al. ............ 345/161 |
| 6,417,838 | B1 * | 7/2002 | Inamura ..................... 345/157 |
| 2002/0070918 | A1 | 6/2002 | Grivas et al. |

FOREIGN PATENT DOCUMENTS

| CN | 1271882 | 11/2000 |
| WO | WO 9630863 | 10/1996 |

* cited by examiner

*Primary Examiner*—Vijay Shankar
(74) *Attorney, Agent, or Firm*—Alfred A. Fressola; Ware, Fressola, Van Der Sluys & Adolphson LLP

(57) ABSTRACT

Control signals for a process displaying graphical objects in a display are generated with a first control surface, a second control surface and detector means. The first control surface is available for manipulation with a thumb of one hand on one side of a hand-held electronic device. The second control surface is adapted for manipulation with another finger of the same hand. It is located on a different side of the hand-held electronic device. The detector means jointly detect how the first and second control surfaces are manipulated, and convey information about detected manipulation of the first and second control surfaces further to generation of the control signals.

27 Claims, 13 Drawing Sheets

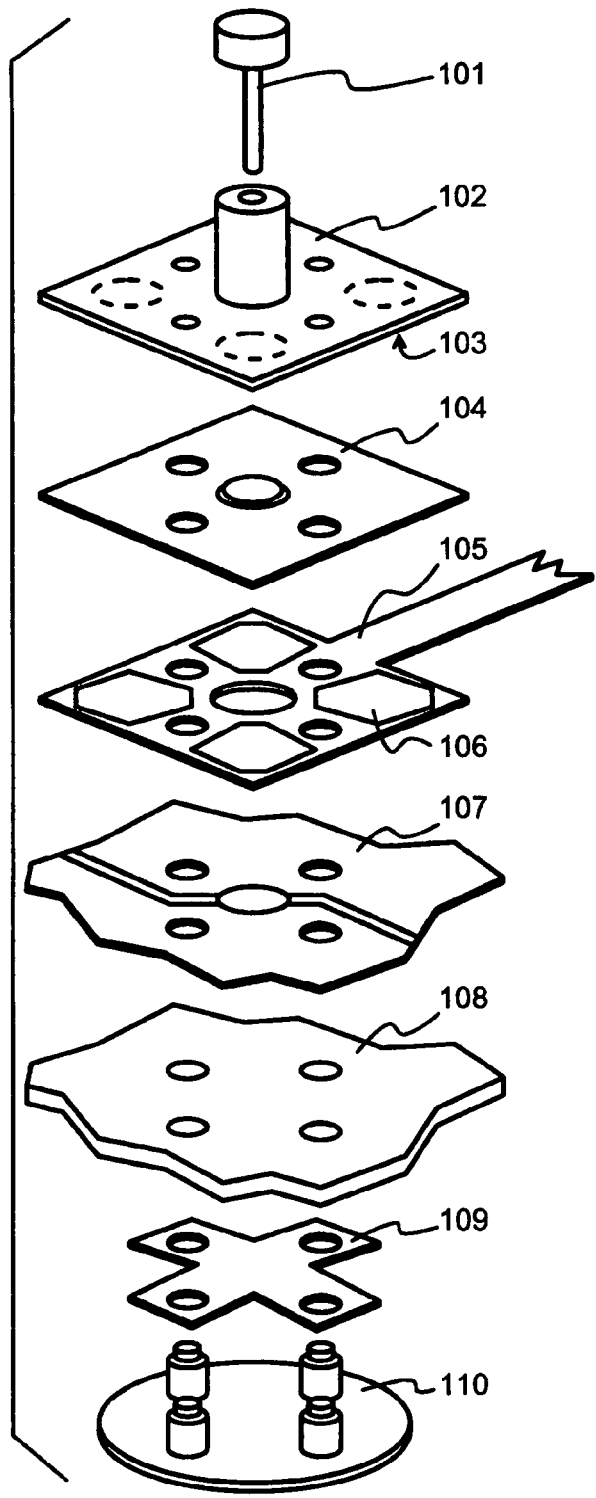
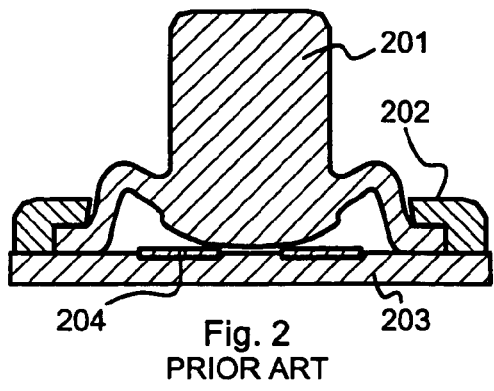
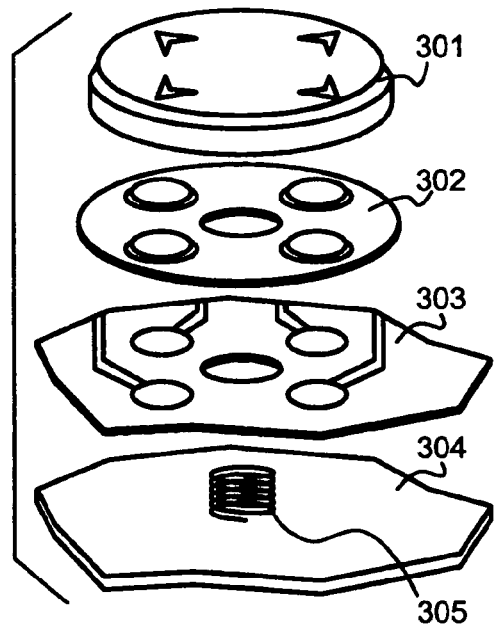
Fig. 1
PRIOR ART
Fig. 2
PRIOR ART
Fig. 3
PRIOR ART

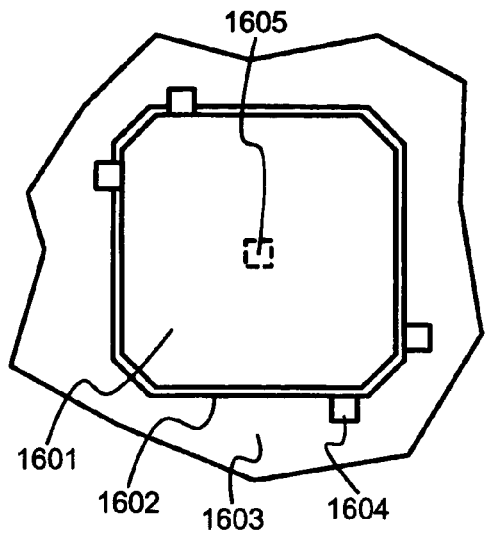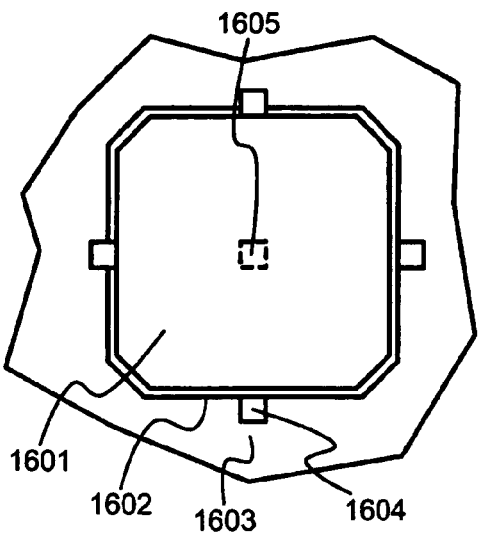
Fig. 16a    Fig. 16b
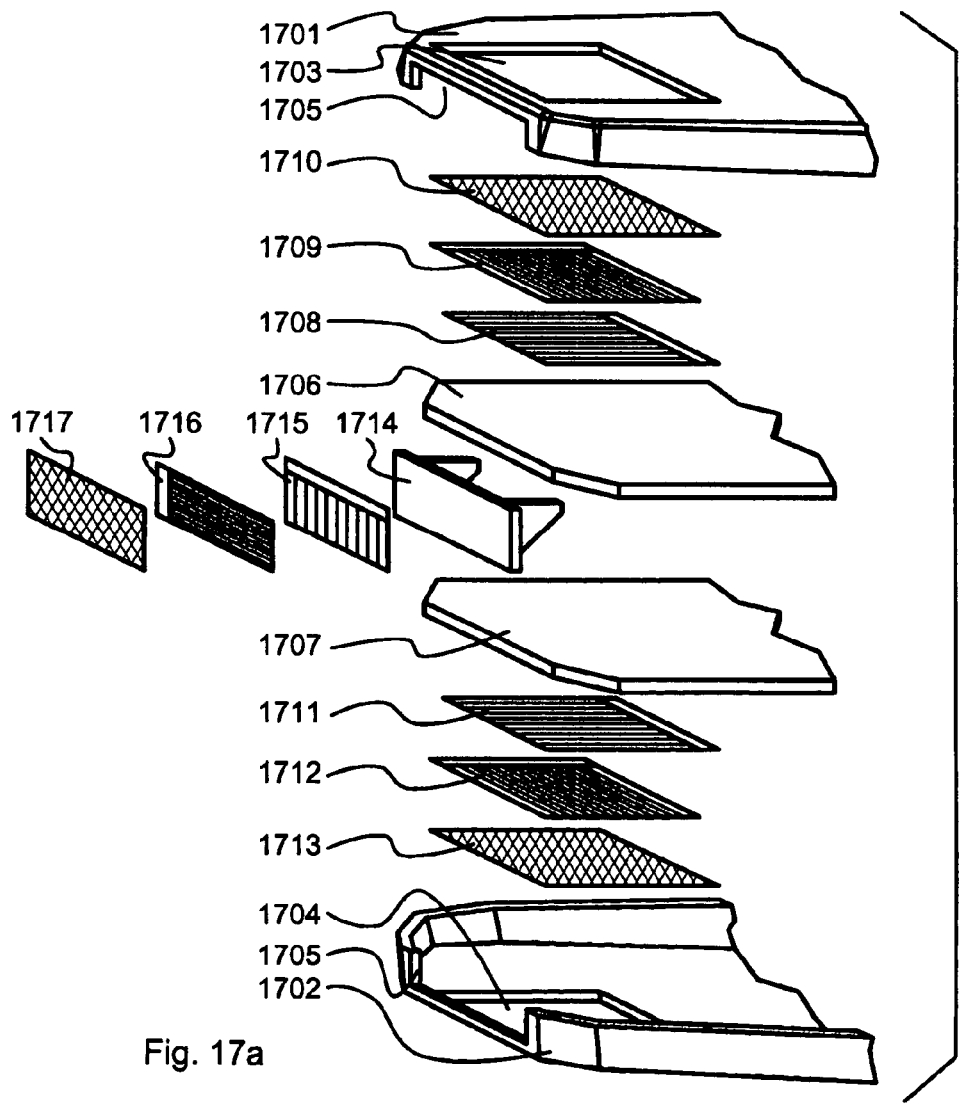
Fig. 17a

CONTROL AND A CONTROL ARRANGEMENT

TECHNICAL FIELD

The invention is generally related to the technical field of controls that constitute a part of the user interface of an electronic apparatus and offer a human user the possibility of generating commands and input information through exerting a force at a control. Especially the invention relates to controls that provide an intuitive and easily adopted way of controlling three-dimensional graphics.

BACKGROUND OF THE INVENTION

The increasing processing power of electronic devices such as computers, game consoles, personal digital assistants (PDAs) and cellular radio terminals has evoked a trend towards using more and more three-dimensional graphics. Although at the time of writing this description an almost exclusive majority of display devices are two-dimensional screens, it is possible to make them show three-dimensional graphics by utilising perspective and shadows, increasing blurredness with increasing observation distance, and using other kinds of graphical tricks that cause a human observer to perceive a two-dimensional image as if it represented truly three-dimensional objects. Three-dimensionality offers attractive possibilities of visualisation e.g. in recreational games, and makes it possible to construct completely new kinds of user interface features where the user may e.g. stroll through a three-dimensional "archive room" when looking for a particular piece of information.

A major problem related to three-dimensional graphics is the need for intuitive and easily adopted controls. The user should be able to affect the way in which he sees things in the three-dimensional "virtual world", typically so that he "moves" therein and/or causes the objects of the virtual world to move.

The most commonly used controls of present-day electronic devices are various arrangements of pressable keys. Other kinds of known controls and input means include touch-sensitive displays, touch pads and miniature joysticks, as well as cylindrical or ball-shaped rollers. A mouse in the form used in personal computers is an aggregate of a ball-shaped roller, a number of pressable keys and nowadays also a cylindrical or wheel-shaped roller. Even steering wheels and pedals are known. Of the known control types the joystick has usually the most intuitive association with a three-dimensional virtual world, at least if a human user can use the joystick for "driving" or "flying" around in the virtually existing three-dimensional space the projection of which he sees in the two-dimensional display.

The publication U.S. Pat. No. 5,541,622 illustrates a good example of a known miniature joystick, which is also schematically shown in the exploded diagram view of FIG. 1. The visible and touchable part of the joystick arrangement is a pin 101, an elongated shaft of which goes through the central bore of an actuator plate 102. A lower surface of the actuator plate 102 comprises a number of bumps 103 distributed radially around a central vertical axis. Below the actuator plate 102 there is a thin, elastic domesheet 104 with a single contact dome centrally located below a lower end of the pin 101. The next layer is a detector sheet 105, which comprises pressure-sensitive detector elements 106 at locations that correspond to those of the bumps 103. There is also a switch pad layer 107 on top of a dielectric support layer 108. A biasing spring 109 is located between the support layer 108 and a lower base plate 110, the attachment pins of which go through the holes in all other layers to engage with respective recesses or attachment holes in the actuator plate 102.

Pushing the top end of the miniature joystick of FIG. 1 sideways causes the bumps 103 to exert varying pressing forces on the radially distributed pressure-sensitive detector elements 106. A detector circuit (not shown) coupled to receive signals from the detector elements 106 converts these signals into an indication of the direction and force with which the joystick was pushed. Pressing the top end directly downwards causes the lower end of the pin 101 to press the contact dome against a switch pad on the switch pad layer 107, which the detector circuit interprets as a direction-independent "mouse click".

FIG. 2 is a schematic cross sectional view of an even simpler miniature joystick structure known from the published patent application number U.S. 2002/0070918 A1. The edges of a joystick part 201, which has an Upwards pointing shaft, are clamped under fastening means 202 that keep the joystick part 201 fastened to a dielectric circuit board 203. Directly below the joystick part 201 there are detector elements 204 on or in the dielectric circuit board 203. The lower surface of the joystick part 201 is convex by shape, so that tilting the joystick part 201 by its shaft causes different points of the convex surface to touch the detector elements. The detection mechanism can be location- and/or pressure sensitive. A detector circuit (not shown) again converts the initially obtained signal from the detector elements 204 into an indication of direction and/or force. A difference between the solutions of FIGS. 1 and 2 is that the joystick of FIG. 1 is isometric, i.e. it stays in an essentially constant position regardless of any tilting forces. The joystick of FIG. 2 can pivot back and forth by tens of degrees as a response to a tilting force. The preferred detection mechanism in said published patent application is electric contact between detector pads through a conductive layer on the convex surface, but the same principle works also with other known detection mechanisms, such as capacitive detection and pressure-dependent resistivity detection.

FIG. 3 is a schematic exploded view of a known multifunctional key, which as a control is a kind of crossbreed between a joystick and a pressable key. The visible surface of the structure consists of a circular key hat 301, below which is an elastic domesheet 302. There are a number of actuators (not shown) protruding from the lower surface of the key hat 301; here the number of actuators is assumed to be four. Below each actuator there is a contact dome in the domesheet 302. The next lower layer is a switch pad layer 303, which resembles very much the similarly named layer 107 in FIG. 1 and has a switch pad below each contact dome. There is a support layer 304 at the bottom, with possibly a biasing spring 305 attached thereto to movably support the key hat 301. Pressing different edges of the key hat 301 causes different actuators to press their corresponding contact dome against the corresponding switch pad, which a detector circuit (not shown) coupled to the switch pads interprets as a "directional" pressure of the control.

FIG. 4 illustrates the conventional way of placing certain controls into a hand-held electronic device 401. At the time of writing this description the well-established practice is to place a display 402 in the middle of a generally elongated device 401, so that a human user naturally grabs the device with both hands and holds it in a horizontal position in front of him. The thumbs rest most conveniently against a top surface of the device, leaving the display 402 visible therebetween. It has been conventional to place a round, joystick-like control 403 onto the top surface beside the display 402, which is the natural location of one thumb. Similarly many prior art devices have a small number of individual, pressable keys 404 distributed onto the top surface, on the other side of the display 402, within easy reach of the user's other thumb.

FIG. 5 illustrates another known way of placing certain controls in a hand-held electronic device. The overall shape of the device 501 resembles two inter-linked handles or butt ends. In a normal operating position a human user grabs the device with both hands, places his thumbs against a top surface 502 to operate keys and/or joysticks (not shown) located thereon, and bends his index fingers to reach the trigger switches 503 located on a lower surface of the device 501.

The intuitiveness of the controls known from prior art in controlling the presentation of three-dimensional graphics is modest even at its best. Using joystick-like controls in portable electronic devices may become problematic if the joystick protrudes remarkably out of the overall appearance of the device. Another problem of prior art is that full three-dimensional control of displayed objects usually requires the user to manually select between available control modes.

SUMMARY OF THE INVENTION

An objective of the invention is to present a control and a control arrangement for controlling the presentation of graphics, particularly three-dimensional graphics, in an intuitive and easily adopted way. It is a further objective of the invention to present an electronic device equipped with a control arrangement of said kind. Another objective of the invention is to present a control and a control arrangement that are easy and intuitive to use for controlling the presentation of graphics, particularly three-dimensional graphics but still take only a small part of the overall volume of an electronic device. A yet further objective of the invention is to present a versatile control and control arrangement that can be modified to match application in many kinds of electronic devices and control modes.

The objectives of the invention are met by providing an electronic device with at least two touchable control surfaces that are located so that a human user may touch them with a grip similar to that used for touching a three-dimensional object, and by coordinating the control signals acquired through said touchable control surfaces so that the way in which the user handles said surfaces can be reflected in the way of presenting graphics in a display.

According to a first aspect of the invention a control for generating control signals for a process displaying graphical objects in a display comprises:
 a first control surface,
 a second control surface, and
 detector means;

wherein:
 said first control surface is adapted for manipulation with a thumb of one hand of a human user and adapted for appearance on one side of a hand-held electronic device,
 said second control surface is adapted for manipulation with another finger of the same hand of the human user and adapted for appearance on a second side of said hand-held electronic device, which second side is different than said first side, and
 said detector means are arranged to jointly detect how said first and second control surfaces are manipulated, and to convey information about detected manipulation of said first and second control surfaces further to generation of the control signals.

According to a second aspect of the invention a control arrangement for generating control signals for a process displaying graphical objects in a display comprises:
 a first control,
 a second control, and
 detector means;

wherein:
 said first control is adapted for manipulation with a thumb of one hand of a human user and adapted for appearance on one side of a hand-held electronic device,
 said second control is adapted for manipulation with another finger of the same hand of the human user and adapted for appearance on a second side of said hand-held electronic device, which second side is different than said first side, and
 said detector means are arranged to jointly detect how said first and second controls are manipulated, and to convey information about detected manipulation of said first and second controls further to generation of the control signals.

According to a third aspect of the invention an electronic device for controllably displaying graphical objects to a human user comprises:
 an outer cover having a first side and a second side,
 a first control surface appearing on said first side,
 a second control surface appearing on said second side, and
 detector means;

wherein:
 said first control surface is adapted for manipulation with a thumb of one hand of a human user holding the electronic device,
 said second control surface is adapted for manipulation with another finger of the same hand of the human user holding the electronic device, and
 said detector means are arranged to jointly detect how said first and second control surfaces are manipulated, and to convey information about detected manipulation of said first and second control surfaces further to generation of the control signals.

According to a fourth aspect of the invention a process for implementing control of graphically displayed objects comprises the steps of:
 detecting manipulation of a first control surface placed on a first side of an electronic device,
 detecting manipulation of a second control surface placed on a second side of the electronic device, said manipulation of said second control surface taking place simultaneously with said manipulation of said first control surface, and
 displaying a movement of a graphically displayed object, which movement is the same in a coordinate system associated with a graphically displayed view as would have been a movement of a solid body in a coordinate system associated with said electronic device if the detected manipulation of said first and second control surfaces would have affected sides of said solid body, said sides being similarly located in relation to each other as the first and second control surfaces are located in relation to each other.

According to a fifth aspect of the invention a process for implementing control of graphically displayed objects comprises the steps of:
 detecting manipulation of a first control surface placed on a first side of an electronic device,
 detecting manipulation of a second control surface placed on a second side of the electronic device, detecting whether said manipulation of said second control surface took place simultaneously with or at a different time than said manipulation of said first control surface, if said manipulation of said second control surface took place simultaneously with said manipulation of said first control surface, displaying a movement of a graphically displayed object, which movement is the same in a coordinate system associated with a graphically displayed view as would have been a movement of a solid body in a coordinate system associated with said electronic device if the detected manipulation of said first and second control surfaces would have affected sides of said solid body, said sides being similarly located in relation to each other as the first and second control surfaces are located in relation to each other, and if said manipulation of said second control surface took place at a different time than said manipulation of said first control surface, displaying movements of a graphically displayed object, which movements are of a first type when only manipulation of the first control surface was detected and of a second type, different than said first type, when only manipulation of the second control surface was detected, which first and second types both are one of the following: translatory movement, rotational movement.

According to a sixth aspect of the invention a computer program product for implementing control of graphically displayed objects comprises computer-executable instructions stored on a computer-readable medium, for execution by a computer processor, for performing the steps of:

detecting manipulation of a first control surface placed on a first side of an electronic device, detecting manipulation of a second control surface placed on a second side of the electronic device, said manipulation of said second control surface taking place simultaneously with said manipulation of said first control surface, and displaying a movement of a graphically displayed object, which movement is the same in a coordinate system associated with a graphically displayed view as would have been a movement of a solid body in a coordinate system associated with said electronic device if the detected manipulation of said first and second control surfaces would have affected sides of said solid body, said sides being similarly located in relation to each other as the first and second control surfaces are located in relation to each other.

According to a seventh aspect of the invention a computer program product for implementing control of graphically displayed objects comprises computer-executable instructions stored on a computer-readable medium, for execution by a computer processor, for performing the steps of:

detecting manipulation of a first control surface placed on a first side of an electronic device, detecting manipulation of a second control surface placed on a second side of the electronic device, detecting whether said manipulation of said second control surface took place simultaneously with or at a different time than said manipulation of said first control surface, if said manipulation of said second control surface took place simultaneously with said manipulation of said first control surface, displaying a movement of a graphically displayed object, which movement is the same in a coordinate system associated with a graphically displayed view as would have been a movement of a solid body in a coordinate system associated with said electronic device if the detected manipulation of said first and second control surfaces would have affected sides of said solid body, said sides being similarly located in relation to each other as the first and second control surfaces are located in relation to each other, and if said manipulation of said second control surface took place at a different time than said manipulation of said first control surface, displaying movements of a graphically displayed object, which movements are of a first type when only manipulation of the first control surface was detected and of a second type, different than said first type, when only manipulation of the second control surface was detected, which first and second types both are one of the following: translatory movement, rotational movement.

In many cases a human user who wants to control the way in which he perceives certain features of graphics, especially three-dimensional graphics, would intuitively like to grab an object shown in the display and rotate or displace it with his hand. According to the present invention an electronic device may offer the user a "virtual object" to grab. A physical representation of said virtual object comprises at least two control surfaces that are located so that touching said control surfaces simultaneously requires a motion that is similar to grabbing a real, three-dimensional object. The user may imagine that instead of just touching certain control surfaces he is actually holding one of the graphically presented objects in his hand. When he wants to move that graphically presented object in the display he exerts a corresponding "moving" force to the control surfaces, which produce corresponding input signals to the electronic device. The electronic device uses these input signals to control the graphical presentation.

It is possible to equip the electronic device with a uniform, solid moving part, some surfaces of which constitute simultaneously the control surfaces that represent the virtual object. However, this leads often to solutions that reserve relatively large portions of the overall volume of the electronic device. In many cases it is more advantageous to use separate physical implementations for the separate control surfaces, so that the feel of a virtual object comes from their coordinated positioning in the electronic device. Electronic circuitry is then used to combine the input signals obtained through the separate control surface implementations.

Using two physically independent control surfaces enables advanced utilisation of the basic control principle so that the actual mode of operation depends on whether the user actuated one or both of the control surfaces simultaneously. Decision logic in the electronic device can thus perform automatical switching between control modes without requiring any additional action from the user.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

FIG. 1 illustrates a known miniature joystick structure,

FIG. 2 illustrates another known miniature joystick structure,

FIG. 3 illustrates a known multifunctional key structure,

FIGS. 16a and 16b illustrate other alternative physical implementations of a virtual control cube, FIGS. 17a and 17b illustrate another alternative physical implementation of a virtual control cube.

DETAILED DESCRIPTION OF THE INVENTION

The exemplary embodiments of the invention presented in this patent application are not to be interpreted to pose limitations to the applicability of the appended claims. The verb "to comprise" and its derivatives are used in this patent application as open limitations that do not exclude the existence of also unrecited features. The features recited in depending claims are mutually freely combinable unless otherwise explicitly stated. Aspects of the invention are described in more detail under the following subheadings.

Principle of a "Control Cube"

A unique feature of the human hand is its ability to perform the key pinch grip. A most natural way of grabbing a three-dimensional object of the size of a sugar lump is to grasp it between the thumb and another finger, most typically the index or middle finger. A person examining an object of that size would take it into a key pinch grip and use the muscles and joints in his fingers, wrist and forearm to move and rotate the object so that he can see it from various angles and distances.

A starting point for designing a control of the kind described here is to offer the human user a "sugar lump" or "control cube" that he can grasp, move and rotate at least in an figurative way. The way in which the user handles the "control cube" in relation to a fixed reference frame known to the electronic device is detected and reflected in the way in which a graphical object or a number of graphical objects are displayed in a display.

Figure 4:
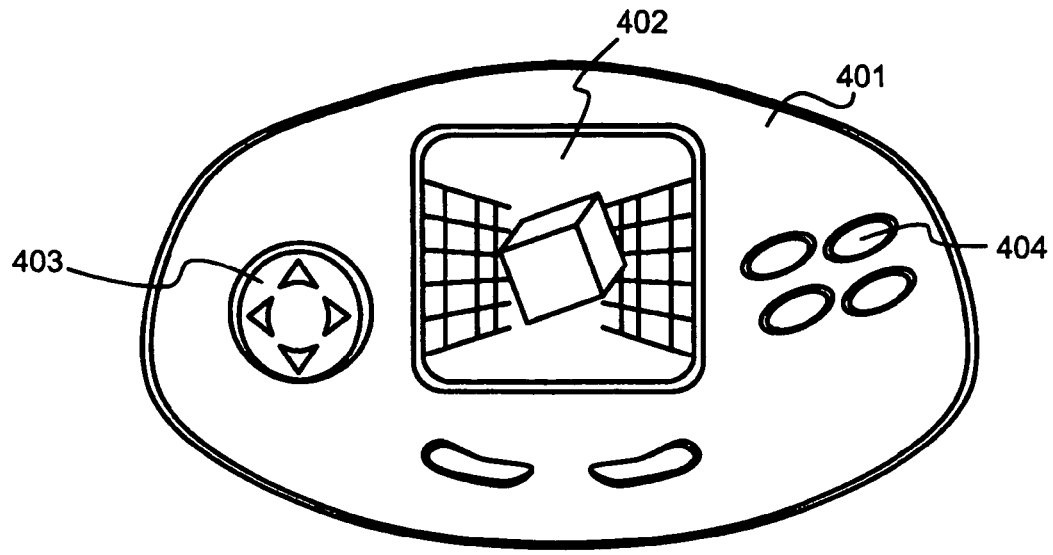
FIG. 4 illustrates a known way of placing controls in a hand-held electronic device.
Figure 5:
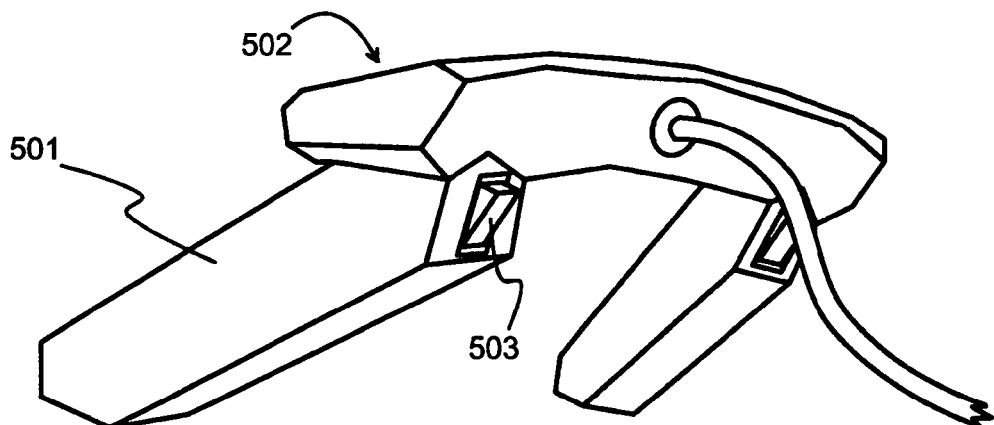
FIG. 5 illustrates another known way of placing controls in a hand-held electronic device.
Figure 6:
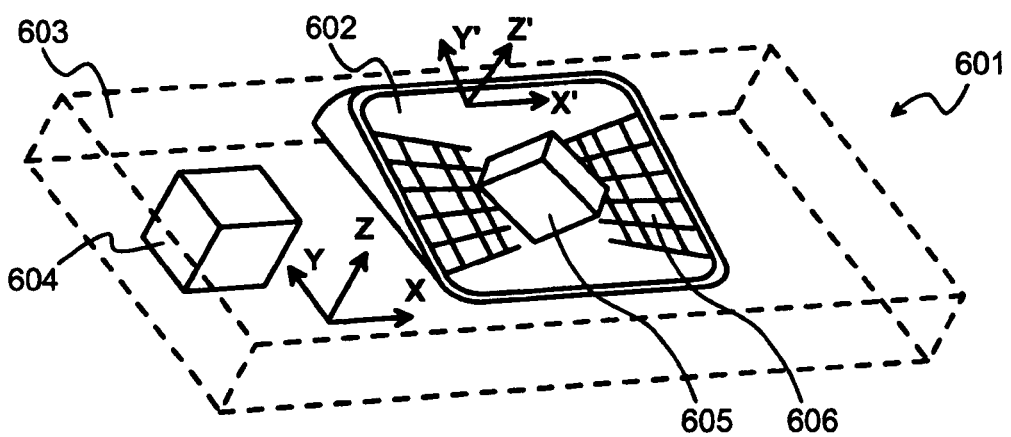
FIG. 6 illustrates the concept of a control cube in a hand-held electronic device.

FIG. 6 is a graphical illustration of this principle implemented in a hand-held electronic device 601 equipped with an integral display 602. The overall physical appearance or outer cover 603 of the device is shown here only schematically with dashed lines, but for the sake of example we assume that the device has a generally longitudinal, box-like shape where the display 602 is in the middle so that a human user desiring to watch the display 602 would naturally hold the device horizontally in front of him with both hands. The left-hand part of the device comprises a control cube 604, which we here assume to be a solid, cube-like member that occupies a square hole through the outer cover 603. The control cube 604 is supported in said square hole in a flexibly movable way, so that a human user may slightly move and twist the control cube 604 in relation to the outer cover 603. Figuratively the mounting of the control cube appears as if the square hole through the outer cover 603 was slightly too large, and the clearance between the control cube 604 and the walls of the square hole were filled with soft rubber or elastic foam plastic.

The outer cover 603 defines a certain spatial coordinate system, which in FIG. 6 appears as the X-Y-Z coordinate system. From the viewpoint of a human user holding the device 601 as described above the X-axis points to the right, the Y-axis points upwards and the Z axis points out of the plane of the top surface of the device 601. The three-dimensional world shown in the display 602 also involves a certain coordinate system, which in FIG. 6 appears as the X'-Y'-Z' coordinate system. In the embodiment of FIG. 6 from the viewpoint of said human user the X'-axis points towards the right-hand edge of the display 602, the Y'-axis points towards the top edge of the display 602 and the Z'-axis points out of the planar top surface of the display 602.

In the natural holding position mentioned above a human user would have the thumb of his left hand resting against the top surface of the control cube 604 and one of the other fingers (typically the index or middle finger) of his left hand against the bottom surface of the control cube 604. Thus the user is holding the control cube 604 in a key pinch grip, despite of the fact that also an essential part of the surrounding outer cover 603 is in the user's left hand.

The electronic device 601 comprises means for detecting how the user moves the control cube 604 in relation to the X-Y-Z coordinate system. Said means are not shown in FIG. 6 for reasons of graphical clarity. We will describe certain advantageous implementations of such means later in this text. For the sake of example we assume that a certain graphical object 605 is currently shown in the display 602 and that the objective of the human user is to examine said graphical object from different sides and/or to move it around in the environment 606 that is also shown graphically in the display 602.

A principle of using the control cube 604 for controlling the presentation of the graphical object 605 is to make the graphical object 605 move in relation to the X'-Y'-Z' coordinate system in the same way in which the control cube 604 would move in relation to the X-Y-Z coordinate system if it could move freely under the moving actions of the user. In other words, if the user e.g. draws the control cube leftwards into the direction of the negative X-axis, the graphical object 605 moves left in the display 602 into the direction of the negative X'-axis. If the user pushes the control cube away from him into the direction of the negative Z-axis, the graphical object 605 moves farther in the display 602 into the direction of the negative Z'-axis. If the user twists the control cube around the Y-axis, the graphical object 605 rotates in the display 602 around the Y'-axis. There are basically six degrees of freedom to choose from: translation in each of the X-, Y- and Z-directions as well as rotation around each of the X-, Y- and Z-axes. A user-induced movement of the control cube 604 in any of said six degrees of freedom can be copied as such into a way in which the graphical object 605 behaves in the display 602.

As an alternative to moving the graphical object 605 in relation to a stationary graphically displayed environment 606 it is also possible to use the detected movements of the control cube 604 to control a way in which the graphically displayed environment 606 is moved, which the user perceives as if the graphical object 605 and/or the person the view of whom is shown in the display 602 was navigating through a virtual, three-dimensional space. The principle of such control is to make the graphically displayed environment 606 to perform the opposite of the detected movement of the control cube 604: for example pressing the control cube 604 into the negative Z-direction should cause the graphically displayed environment 606 to be moved into the positive Z'-direction, which the user perceives as if the graphical object 605 propagated forward (into the negative Z'-direction) within the graphically displayed environment 606. All of said six degrees of freedom can be handled similarly to represent all possible translations and turns within the graphically displayed environment 606.

Figure 7:
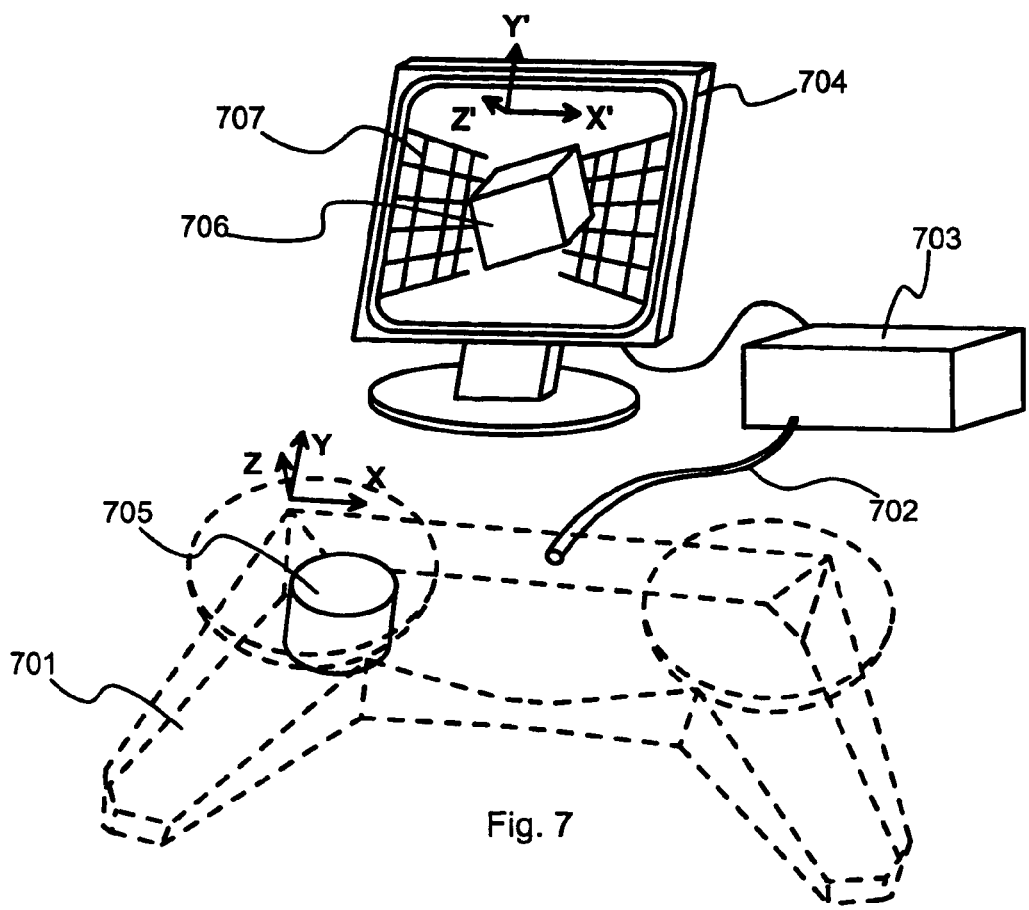
FIG. 7 illustrates the concept of a control cylinder in a hand-held controller device.

FIG. 7 illustrates the same principle applied to an apparatus where the hand-held device 701 is a controller, from which there is a communication connection 702 to a central unit 703 and/or an external display device 704. Here the conceptual appearance of the control that is used in the same way as the control cube above is that of a control cylinder 705. It is placed into a round hole through a part of the hand-held device 701. The most natural operating position of the hand-held device 701 is such where the user grabs the handle-like projections with his hands. In this position the thumb of one hand comes against the upper visible surface of the control cylinder 705, and the index or middle finger of the same hand comes against the lower surface of the control cylinder 705, which is visible on the underside of the hand-held device 701. Thus the control cylinder 705 is in a key pinch grip of one hand of the user.

FIG. 7 shows the overall physical appearance of an outer cover of the hand-held device 701 is in an X-Y-Z coordinate system, where the hand-held device 701 is adapted to detect the way in which a user moves or tries to move the control cylinder 705 in relation to the X-Y-Z coordinate system. The apparatus of FIG. 7 is adapted to convert information about the detected moving or detected attempted moving of the control cylinder 705 in relation to the X-Y-Z coordinate system into a way in which the graphical object 706 and/or its environment 707 move in relation to the X'-Y'-Z' coordinate system defined in the graphically displayed image.

In FIGS. 6 and 7 it must be noted that the selection of coordinate systems, particularly the X'-Y'-Z' coordinate system defined in the graphically displayed image, is arbitrary and can be made in any suitable way that is most advantageously selected by experimenting to find the one that is most intuitive for a human user. One possible class of coordinate selection is such where the Z'-axis points into the "upwards" direction of the graphically displayed three-dimensional world, which direction in a normal view would correspond to that pointing towards the top edge of the display. In some applications it may be advantageous to continuously display a small coordinate system symbol within the graphically displayed environment to keep the user aware of which direction is which.

Physical Implementations of a "Control Cube"

The concept of a control cube should be construed in a very figurative sense, because the invention does not require its physical appearance to resemble a cube—it is even questionable, whether in certain embodiments of the invention the "control cube" has any physical appearance at all! Above we already introduced the actual physical appearances resembling a cube and a cylinder. In the following we elaborate upon several alternatives for physical implementation and appearance of a control that can be figuratively thought to constitute a control cube.

Figure 8A:
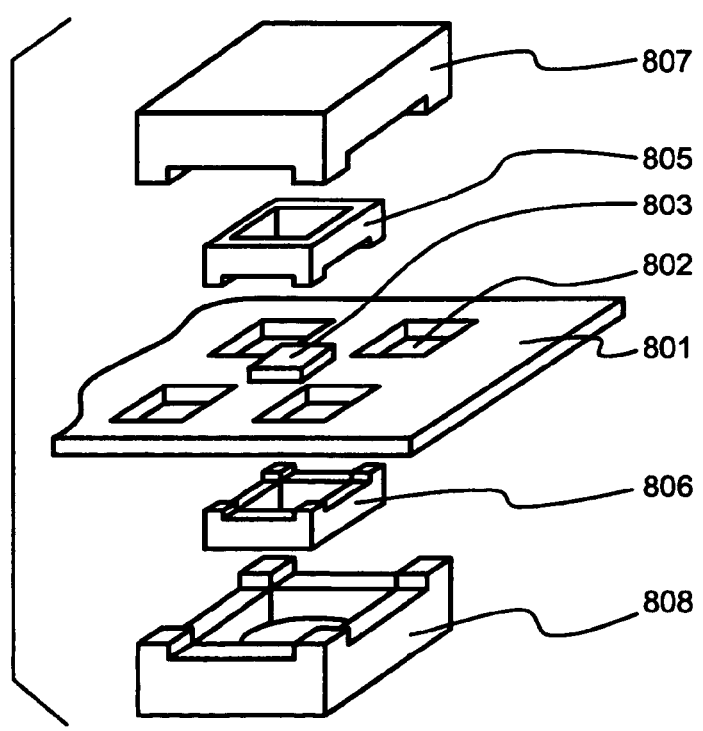
FIGS. 8a to 8e illustrate the physical implementation of a control cube.

FIG. 8a is a schematic exploded view of a certain physical implementation of a control cube, which in this case really has a cubical physical appearance. An electronic device comprises a printed wiring board (PWB) 801 or a corresponding planar support structure with a number of openings 802 therethrough. Here an exemplary number of the openings 802 is four and their locations constitute a regular rectangular grid, at the middle of which there is supported a pressure- and/or location-sensitive sensor 803. A similar sensor is located on the underside of the PWB 801, although not shown in FIG. 8a for graphical clarity.

A flexible support structure consists of an upper support half 805 and a lower support half 806, which are made of soft rubber or other elastic material. The support halves 805 and 806 are hollow tubes or frames that leave the external surfaces of the pressure- and/or location-sensitive sensors reachable, when the support halves 805 and 806 are in place so that the projections on their facing sides touch each other through the openings 802. An outer cover of the structure consists similarly of an upper cover half 807 and a lower cover half 808, which together form a cube with a spacious slit across each vertical surface.

Figure 8B:
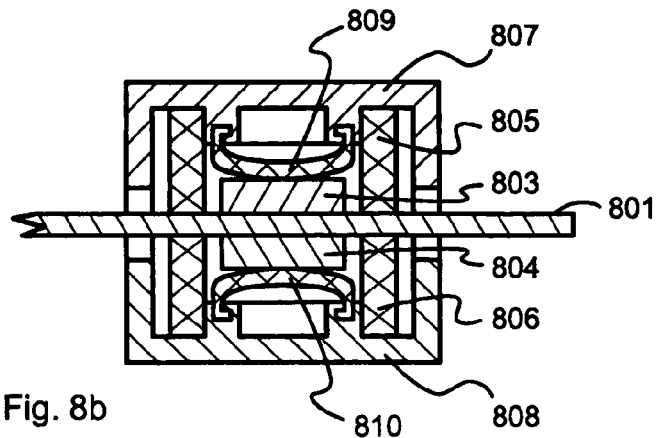
Figure 8C:
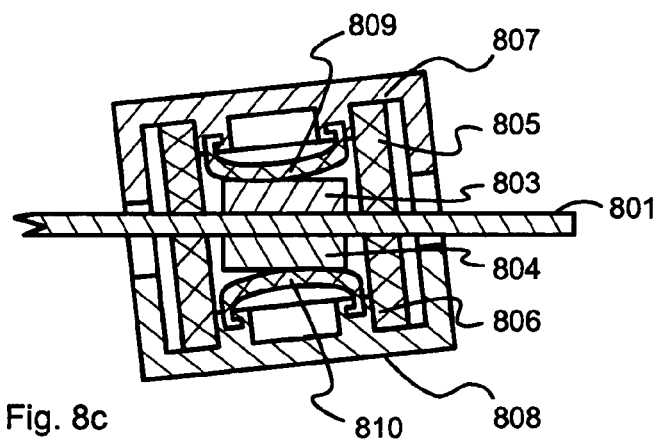
Figure 8D:
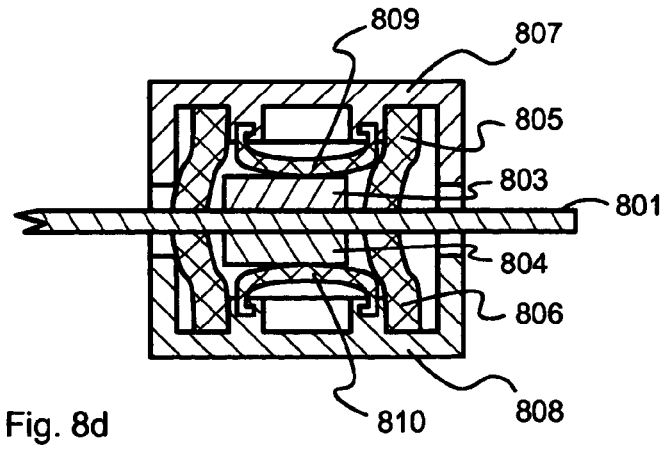

FIGS. 8b, 8c and 8d are cross-sectional views of an assembled control cube of the kind shown in FIG. 8a. In addition to those parts shown in FIG. 8a, FIGS. 8b, 8c and 8d illustrate the lower sensor 804 as well as the convex actuators 809 and 810 located inside the upper 807 and lower 808 cover halves respectively. FIG. 8c illustrates how rotating the control cube causes the touching point between the upper actuator 809 and the upper sensor 803 to deviate into one direction, while simultaneously the touching point between the lower actuator 810 and the lower sensor 804 deviates into the opposite direction. FIG. 8d illustrates how a translatory movement of the control cube deviates both touching points into the same direction. Moving the control cube in the direction perpendicular to the surface of the PWB 801 would cause the pressure on one sensor to increase and the pressure on the opposite sensor to decrease.

Figure 8E:
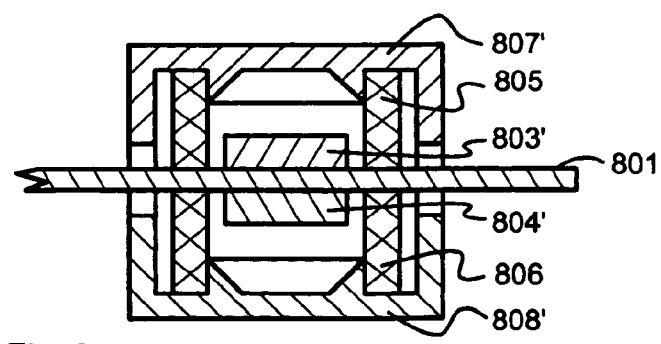

FIG. 8e illustrates a slightly different embodiment, where the upper sensor 803' and lower sensor 804' are contactless sensors, such as Hall sensors, capacitive sensors or optical sensors. The appearance of the upper 807' and lower 808' cover halves is now simpler, because they only need to comprise enough formations to be locked to each other and to be firmly attached to the flexible support means represented by the support halves 805 and 806. It should be noted that the parts of the control cube at the inner surfaces of which measurements are made with the sensors 803' and 804' need not be the same parts upon which a human user exerts forces; it is perfectly possible to present an embodiment where the surfaces that the user manipulates are e.g. "top" and "bottom" outer surfaces of the control cube, while sensors measure the movements of the control cube from e.g. "left" and "right" inner side surfaces of the cube. The number of surfaces available for manipulation can be also greater than two, as can be the number of surfaces or points at which measurements are made.

Figure 9:
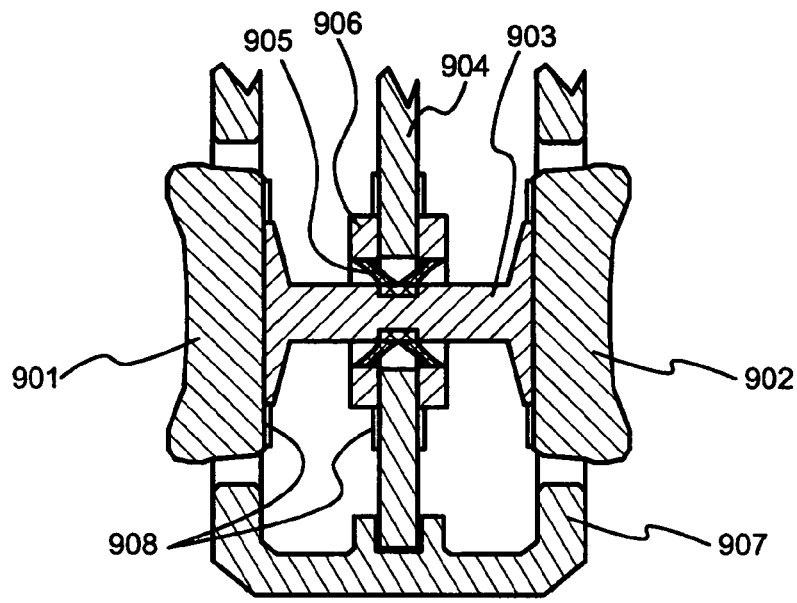
FIG. 9 illustrates an alternative physical implementation of a control cube.

A solid cube like that shown in FIGS. 8a to 8e involves the disadvantage that it reserves a relatively large space in an electronic device, especially taking into account the strong trend towards miniaturisation in devices like PDAs and portable communications devices. This disadvantage is independent of whether the actual form used is a cube, a linear cylinder or any other single mechanical entity that is fullboled from a rim of said first control surface to a rim of said second control surface. FIG. 9 is a schematic cross section of an alternative structure, where the "control cube" is not a cube at all but resembles more an hourglass. It comprises a first finger pad 901 and a second finger pad 902. Each finger pad has a slightly concave outer surface and a flat inner surface. The inner surfaces of the first 901 and second 902 finger pads face each other, and are connected together with a rigid shaft 903 that goes through an opening in a PWB 904 or similar inner support structure of the electronic device. Flexible mounting means attach the shaft 903 to the PWB 904. In the exemplary embodiment of FIG. 9 the flexible mounting means comprise a biconical rubber ring 905, the outer rim edges of which are attached to the PWB 904 with attachment rings 906. The inner rim edge(s) of the biconical rubber ring 905 is/are attached to the shaft 903 at or close at its middle point. Openings in the outer cover 907 of the electronic device allow the finger pads 901 and 902 to move both sideways and in the longitudinal direction of the shaft 903.

Detecting the movements of the "control hourglass", which is synonymous to detecting the movement of the finger pads 901 and 902, is made in FIG. 9 by using capacitive sensors that comprise mutually corresponding pairs of electrodes attached to the finger pads 901 and 902 as well as to the PWB 904.

Figure 10:
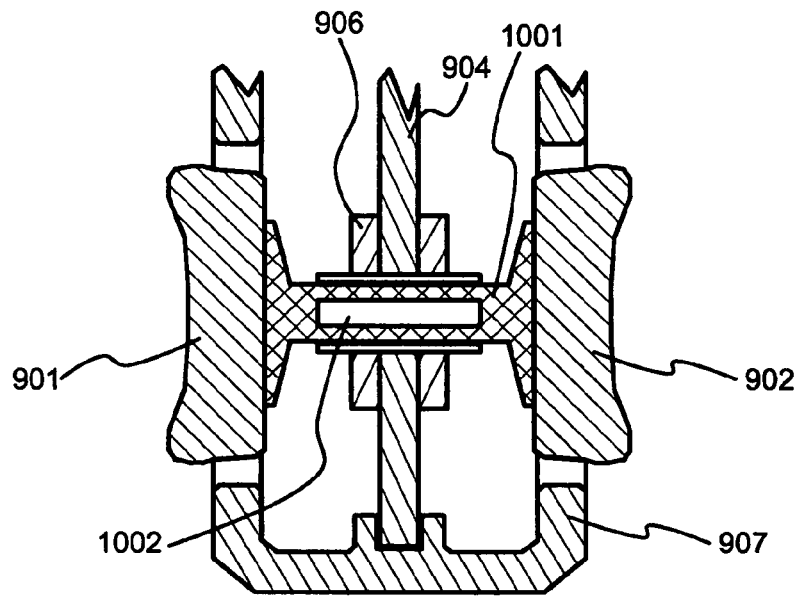
FIG. 10 illustrates another alternative physical implementation of a control cube.

FIG. 10 illustrates a slightly different embodiment where the rigid shaft of FIG. 9 is replaced with a flexible shaft 1001. The attachment rings 906 have now only the purpose of mechanically reinforcing the part of the PWB 904 that has the opening for the shaft 1001. Sideways movements of the finger pads 901 and 902 bend the flexible shaft 1001, which bending is detected and measured with piezoelectric strips 1002 attached to the shaft 1001. Movement of the "control hourglass" in the longitudinal direction of the shaft is also detected with the piezoelectric strips 1002, because the contracting of the pressed side of the shaft in the axial direction distorts one end of each strip. Other kinds of sensors, such as the capacitive sensors of FIG. 9 could be used instead of or in addition to the piezoelectric sensors.

Figure 11:
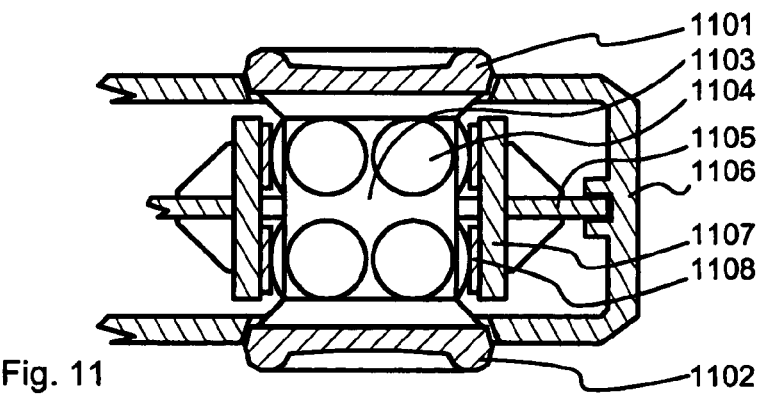
FIG. 11 illustrates another alternative physical implementation of a control cube.

FIG. 11 introduces an isometric control cube solution in a partial cross section view. A first finger pad 1101 and a second finger pad 1102 are attached to opposite faces of a cubical center part 1103. Each of the four remaining faces of the cubical center part 1103 comprises four outwards-facing actuator bumps 1104. A PWB 1105 supported within an outer cover 1106 of an electronic device has a square opening, the edges of which are flanked with side wall plates 1107 that together constitute a rectangular tunnel through the PWB 1105, in which tunnel the cubical center part 1103 resides. Each side wall plate 1107 is parallel to an adjacent face of the cubical center part 1103 and comprises four pressure-responsive sensors 1108, one for each actuator bump.

Translatory forces exerted upon the control cube are detected by observing a similar signal from all sensors of one side wall plate 1107, while rotational forces around those axes that are parallel to the PWB 1105 cause an opposite signal from top row sensors compared to that of bottom row sensors. Rotational forces around the axis that is perpendicular to the PWB 1105 causes opposite signals from left column sensors compared to that of right column sensors on all side wall plates. Pushing or pulling the control cube in the direction of the axis that is perpendicular to the PWB 1105 can be detected by adding two additional pressure-sensitive sensors directly under the finger pads 1101 and 1102, or by placing the side wall plates 1107 at slightly oblique angles against the PWB 1105 so that the "tunnel" through the PWB is narrower at one end than at the other; in the last-mentioned case pushing or pulling the control cube in the direction of the axis that is perpendicular to the PWB 1105 causes a similar signal from all sensors.

All embodiments that have been described so far involve the assumption that the touchable surfaces of the "control cube", i.e. those at least two surfaces of which a human user naturally takes a key pinch grip, really are surfaces of a single mechanical body; be it a cube, a cylinder or an hourglass. Under this assumption we may still make some generalisations to what has been described so far. Almost any three-dimensional form could do, if only it is of the suitable size and comprises suitable surfaces for the key pinch grip, and if it can be mounted in the electronic device so that said surfaces are reachable with the thumb and at least one other finger of one hand. The mounting of the "control cube" must facilitate measuring either the translatory and rotational movements thereof or—in isometric solutions—the forces exerted thereupon that would cause such movements if the "control cube" was allowed to move.

As one alternative we might consider a spherical member supported on rollers similar to those used in a computer mouse, the diameter of said spherical member being large enough to allow it protrude out of two opposite sides of an outer cover of an electronic device. Detecting rotational movements of such a spherical member could be accomplished with any of the known means for detecting the rotation of a mouse ball, including but not being limited to rotatory detectors placed against the surface of the spherical member, and optical means. In addition to the detection of rotation there should also be means for detecting translatory forces and/or movements, which can be accomplished by e.g. equipping the support rollers that keep the spherical member in place with pressure-sensitive mountings. Also Hall sensors can be used for the detection of movement, together with arbitrary selected "control cube" forms and mounting means.

Figure 12:
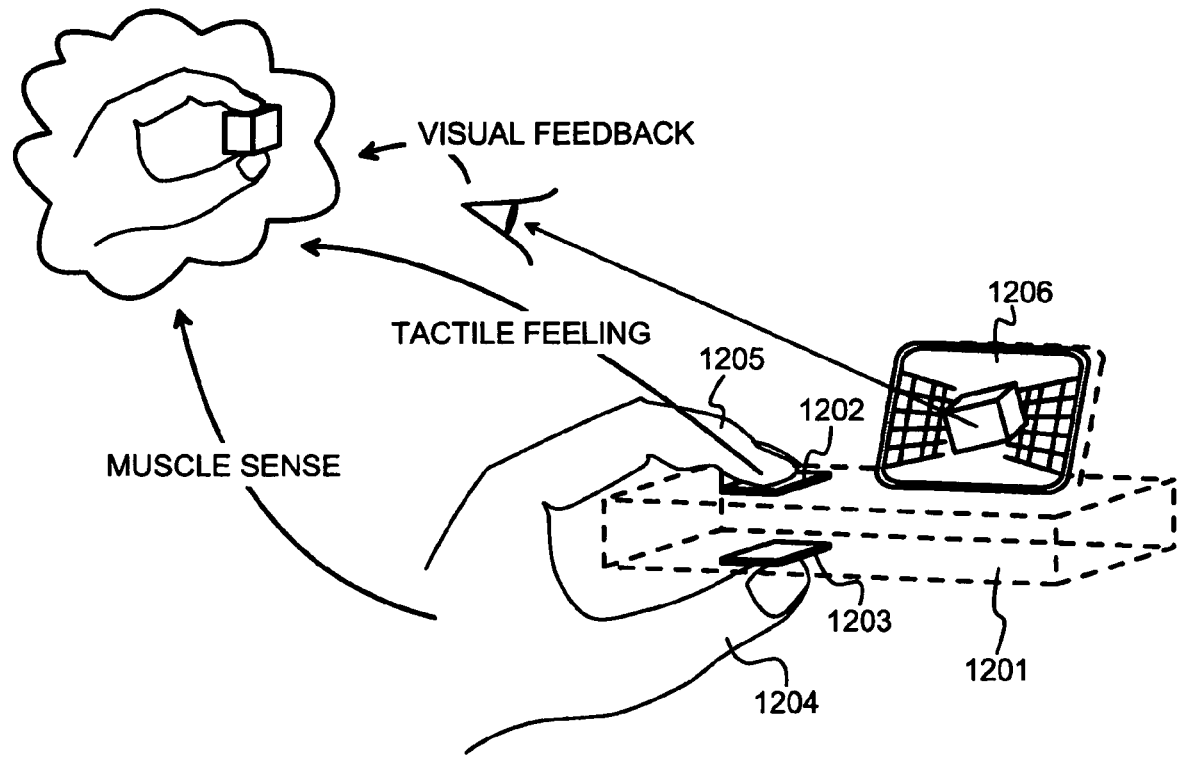
FIG. 12 illustrates the concept of a virtual control cube.

However, the invention does not require the touchable surfaces to be the surfaces of a single mechanical body. FIG. 12 illustrates schematically the principle of a "virtual control cube". We assume that an electronic device 1201 comprises a first control surface 1202 and a second control surface 1203 so placed that in a normal operating position a human user would take a key pinch grip of said control surfaces. In other words, in said normal operating position a human user would naturally place his thumb 1204 against one and his index or middle finger 1205 against the other of the control surfaces. The electronic device 1201 is adapted to display graphical objects, preferably three-dimensional graphical objects, in a display 1206, which here is shown to constitute an integral part of the electronic device 1201. A separate display could also be used instead or in addition to the integrated display 1206.

The first and second control surfaces 1202 and 1203 are responsive to the way in which they are manipulated, which means that pressing and/or moving them causes various input signals for the electronic device 1201 to be generated. For example, each of the first and second control surfaces 1202 and 1203 may be the visible part of a miniature touch pad, or a flat-ended miniature joystick, or a multifunctional pressable key like that shown earlier in FIG. 3. They are not surfaces of any common mechanical entity that could be moved in relation to the electronic device 1201: there is no "control cube". The mechanical structure of the first control surface 1202, as well as the mechanism of detecting how the user moves or manipulates it, may be completely independent of the corresponding structure and mechanism of the second control surface 1203.

However, the user feels as if he was using a control cube. This feeling comes from a number of factors:
- the muscle sense of the user gives him a similar sensory feeling as if he was holding a "control cube" in his key pinch grip
- the tactile feeling of the first and second control surfaces 1202 and 1203 is similar, as if they were surfaces of a common, solid mechanical entity
- the optical feedback the user gets from the display 1206 also suggests that the way in which the user moves his hand causes a (graphically displayed) three-dimensional object to move.

Figure 13:
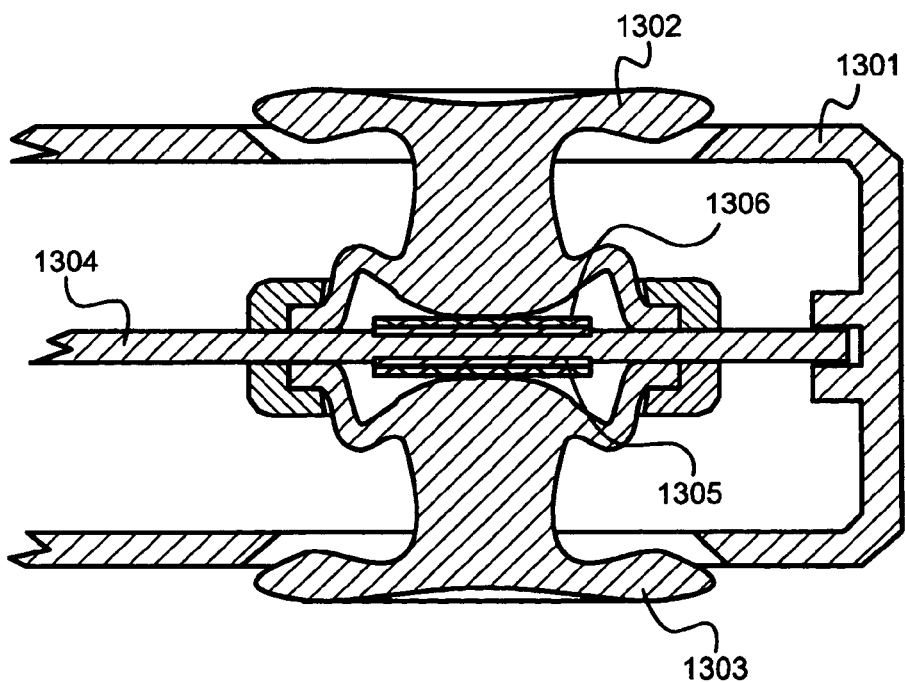
FIG. 13 illustrates the physical implementation of a virtual control cube.

FIG. 13 is a cross-sectional view of one possible physical implementation of the "virtual control cube" principle. The outer cover 1301 of an electronic device defines two openings on its opposite sides. In each of said openings the visible end of a miniature joystick is easily reachable for a human user. The upper miniature joystick 1302 and the lower miniature joystick 1303 both alone would resemble the known prior art structure of FIG. 2. Inside the electronic device there is a printed circuit board 1304, the upper and lower surfaces of which are involved in supporting the inner end of the upper 1302 and lower 1303 miniature joysticks and the pressure-sensitive electric detectors 1305 that together with the convex inner end of each joystick enable detecting the way in which the joysticks are tilted. As a difference to the structure of FIG. 2 there is an additional soft filler layer 1306 between the inner end of each miniature joystick and the corresponding detectors; it helps in enabling the detection of direct pressing on the miniature joystick, because the diameter of a deformation range in the filler layer 1306 is proportional to the pressing force. A miniature joystick that has a flat, pad-like outer end like in the structure of FIG. 13 is sometimes also called a joypad, because the user perceives it more as a control pad than as a control stick of any kind.

Figure 14:
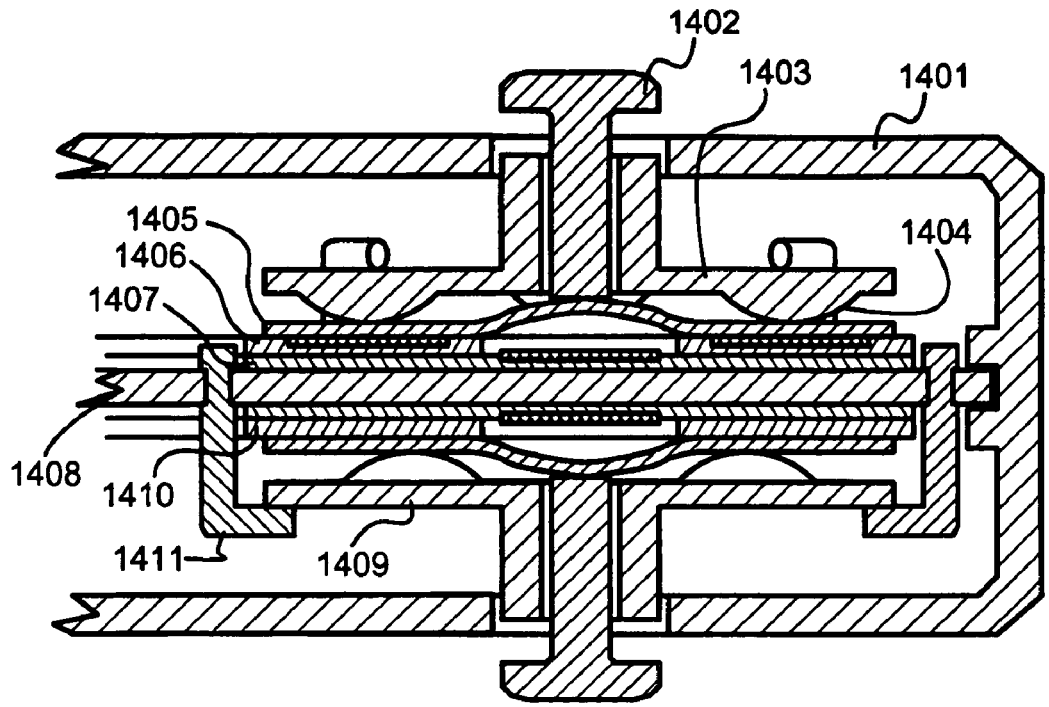
FIG. 14 illustrates an alternative physical implementation of a virtual control cube.

FIG. 14 is a cross-sectional view of another possible physical implementation of the "virtual control cube" principle. This time the structural and functional solution involves using isometric miniature joysticks with clicking function, much like that described earlier in association with FIG. 1. The outer cover 1401 of an electronic device again defines two openings on its opposite sides. In each of said openings the visible end of an isometric miniature joystick is easily reachable for a human user. The upper miniature joystick comprises a vertically movable pin 1402 located in a bore that goes through an actuator plate 1403. A lower surface of the actuator plate comprises a circular array of bumps 1404. Below the actuator plate 1403 there is an elastic domesheet 1405, at the middle of which there is a contact dome. A lower end of the pin 1402 rests against the top of the contact dome. Below the domesheet 1405 there is a detector sheet 1406 with a pressure-sensitive detector corresponding to each bump 1404 in the actuator plate 1403. A switch pad layer 1407 is located between the detector sheet 1406 and a printed wiring board 1408; the task of the switch pad layer 1407 is to provide a switch pad where a downwards bulging movement of the contact dome in the domesheet 1405 causes an electric contact.

The printed wiring board 1408 is a central support structure, in which purpose it serves both the upper and lower miniature joysticks. The lower miniature joystick comprises all the same parts as its upper counterpart in an upside-down configuration; their slightly different appearance in FIG. 14 comes from the fact that the bumps in the lower actuator plate 1409, as well as the corresponding pressure-sensitive detectors in the lower detector sheet 1410 and the attachment means 1411 are displaced by 45 degrees around the common vertical axis of symmetry of the upper and lower miniature joysticks.

Figure 15:
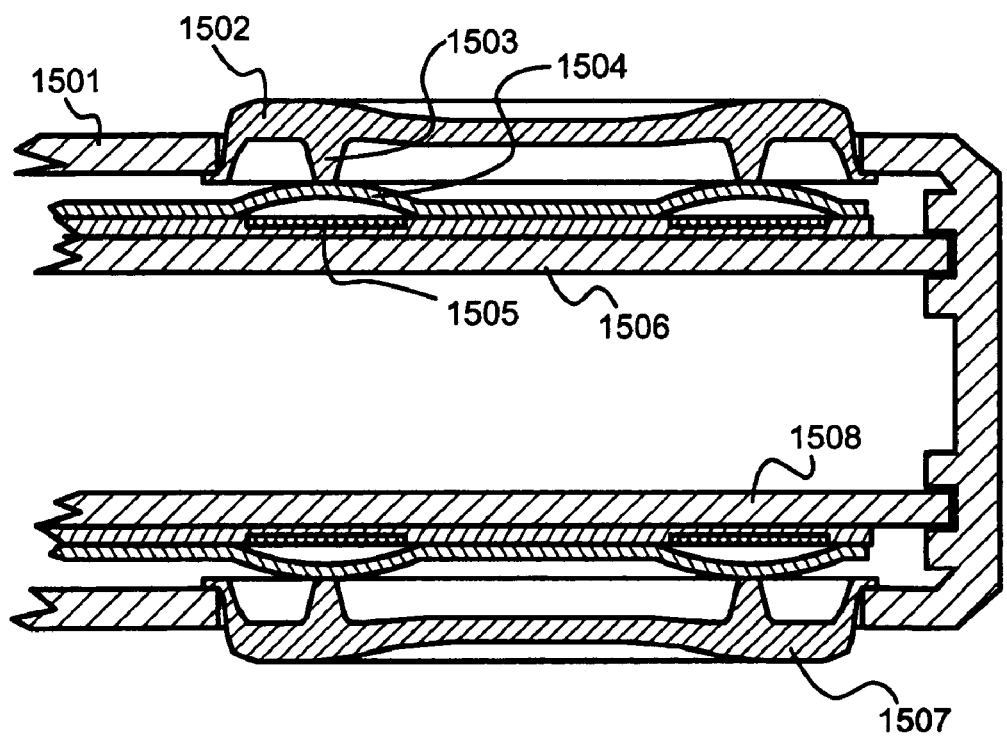
FIG. 15 illustrates another alternative physical implementation of a virtual control cube.

It is perfectly possible to realize a "virtual control cube" solution so that the first and second control surfaces have no common structural parts at all, except the outer cover of the electronic device which itself typically does not have any other role than offering the mechanical frame and outer appearance in which the controls are located. FIG. 15 is a cross-sectional view of a physical implementation where the upper and lower sides of the outer cover 1501 of an electronic device each have a multifunctional key. On the upper surface an upper key hat 1502 is visible. Inside the upper key hat 1502 there are a number of peg-like actuators 1503, each of touching the convex side of a corresponding contact dome 1504. Below each contact dome there is a contact pad 1505, so that pressing the key hat 1502 downwards at the location of a certain actuator 1503 causes the conductive concave side of the corresponding contact dome to form an electric contact within the contact pad 1505. An upper support board 1506 acts as a mechanical support. A similar but structurally independent mechanism is located in an upside-down configuration between a lower key hat 1507 and a lower support board 1508.

FIGS. 16*a* and 16*b* illustrate a yet other structural principle for implementing one of the first and second control surfaces of a "virtual control cube". In each of FIGS. 16*a* and 16*b* there is a button or pad 1601, which is fitted into a recess 1602 of the outer cover 1603 of an electronic device either isometrically or so that it can slightly move sideways. The button or pad 1601 may be a bit flexible at the middle. At the sides of the recess 1602 there are sensors 1604, which either react to the small allowed movements of the button or pad 1601 in the sideways direction, or (in the isometric case) just sense the force with which the button or pad 1601 is pushed sideways. Below the middle of the button or pad 1601 there is a pressure-sensitive sensor 1605. In the case of FIG. 16*a* all sensors 1604 may also be simply pressure-sensitive, because their noncentral location along the sides of the recess 1602 enables detecting also clockwise and counterclockwise rotation of the button or pad 1601. In the case of FIG. 16*b* the sensors 1604 should be able to sense both direct pressure against the edge of the recess 1602 and a cutting force in the direction of the side of the recess 1602 in order to also detect clockwise and counter-clockwise rotation.

FIG. 17*a* is a schematic exploded view of a three-sided "virtual control cube" solution where the sensing technology is based on capacitive touch pads. A capacitive touch pad as such represents known technology: examples include the GlidePoint® technology developed and marketed by ALPS Electric Co., Ltd, who also owns the registered trademark GlidePoint. In FIG. 17*a* an outer cover of an electronic device comprises an upper part 1701 and a lower part 1702. Together these define an upper opening 1703 through a top surface of the outer cover, a lower opening 1704 through a bottom surface of the outer cover and a side opening 1705 through a side surface of the outer cover. Inside the electronic device there are an upper PWB 1706 and a lower PWB 1707. A top surface of the upper PWB 1706 comprises a stack of an Y electrode layer 1708, an X electrode layer 1709 and a protective outer layer 1710. Similarly a bottom surface of the lower PWB 1707 comprises a stack of an Y electrode layer 1711, an X electrode layer 1712 and a protective outer layer 1713. Attached at an essentially perpendicular angle against at least one of the PWBs there is a small auxiliary support board 1714 with a stack of an Y electrode layer 1715, an X electrode layer 1716 and a protective outer layer 1717 on its outer surface.

Figure 17B:
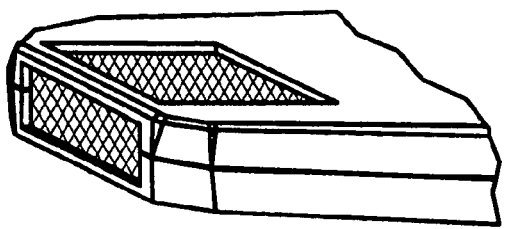

In an assembled configuration the layers 1708, 1709 and 1710 stacked on the upper PWB 1706 constitute a top side capacitive touch pad that is visible and reachable through the upper opening 1703, the layers 1711, 1712 and 1713 stacked on the lower PWB 1707 constitute a bottom side capacitive touch pad that is visible and reachable through the lower opening 1704, and the layers 1715, 1716 and 1717 stacked on the auxiliary support board 1714 constitute a lateral side capacitive touch pad that is visible and reachable through the side opening 1705 (see FIG. 17*b*).

The detailed features of the physical implementations described above can be freely exchanged between the different exemplary embodiments. For example, the use of two different PWBs or other support boards as in FIG. 15 is by no means limited to use with multifunctional keys; it can also be combined with the use of touch pads, miniature joysticks etc. Similarly the invention is not limited to using exactly the same physical implementation for the upper and lower control surface: one may be a multifunctional key while the other is a miniature joystick, and so on. However, it should be noted that using the same physical implementation typically simplifies the manufacturing process; it also helps to achieve a similar tactile feeling of both control surfaces, which is advantageous for the purpose of intuitiveness.

Placing the "Control Cube" and Other Controls in a Hand-Held Device

Figure 18:
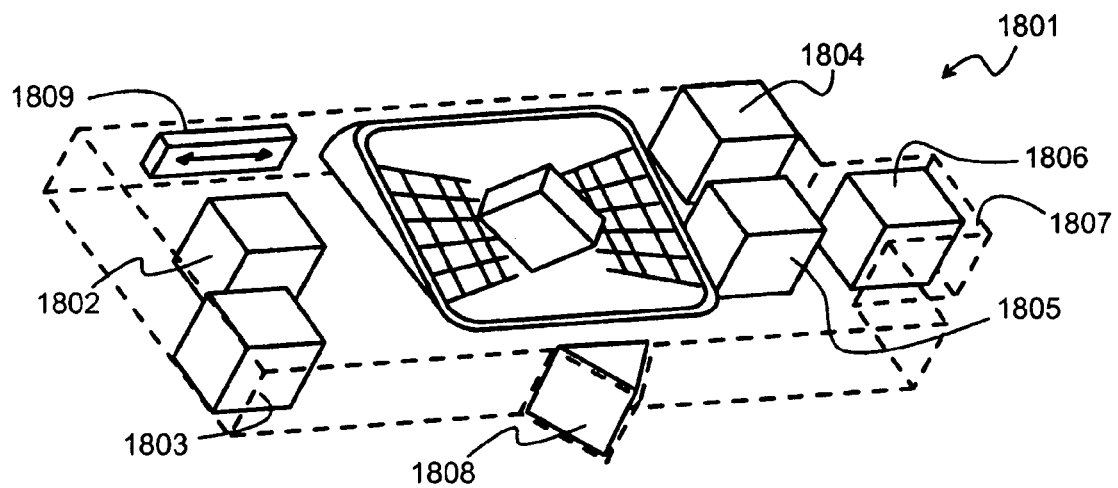
FIG. 18 illustrates possible locations of a control cube or virtual control cube in an electronic device.

The invention places little or no limitations to the way in which those controls are placed in a hand-held device that constitute a control cube or a "virtual control cube". The sole requirement is that a human user should be able to use a key pinch grip to hold the control cube or "virtual control cube". FIG. 18 illustrates certain alternative locations in a hand-held device 1801 that in a normal operating position should be horizontally in front of the user, both hands holding one end of the generally elongated device. Although a solid cube is used in the drawing for graphical clarity, the same considerations apply to a "virtual control cube". At 1802 a control cube is located in the middle part of the electronic device 1801, at a location where the user's thumb and other fingers can easily reach its surfaces. At 1803 the control cube is located in a slot that is "cut" into one of the side edges of the electronic device. At 1804 the control cube constitutes one corner of the overall shape of the electronic device. A control cube may be located either in the left-hand part or in the right-hand part of the electronic device. The electronic device could also include two control cubes, one for each hand, like cubes 1802 and 1805 in FIG. 18.

In solutions where a control cube is at an edge of the electronic device, like locations 1803 and 1804 in FIG. 18, the designer of the device has certain freedom to decide, which surfaces of the conceptual cubical form are the actual control surfaces. If there is an actual, solid cube, this is not a very important question, because the user can touch any side of it he wants, and the electronic detects the movements of the cube independently of which sides were actually used to exert forces on the cube. However, applying for example location 1803 and the concept of a "virtual control cube" leaves it to the designer to decide, which of the three visible sides of the conceptual cube are equipped with actual control surfaces. It is also possible to equip all three visible sides of the cube with control surfaces.

Location 1806 illustrates placing the control cube in a protruding part 1807 of the outer cover of the electronic device 1801. Here the designer of the device has considerable freedom to select among a totality of five different surfaces, which of them will provide access to the control cube, either in the form of an opening in the outer cover through which an actual, solid cube can be touched, or in the form of a control surface that together constitute a "virtual control cube" at location 1806. The slightly smaller size of the control cube at location 1806 than the size of the protrusion 1807 in FIG. 18 mainly comes from an aim towards graphical clarity in the drawing, but also illustrates how it may be advantageous to keep the control surfaces slightly withdrawn from the outmost levels of the outer cover in order to minimise a risk of unintentionally actuating the control cube.

Placing a control cube at location 1806 already approaches the concept of a protruding joystick as known previously, however with the important difference that in a protruding joystick the movable structure as such protrudes out of somewhere, while at location 1806 the movable structure (or in an isometric solution: the structure upon the surfaces of which forces are to be exerted) is essentially inside the contours of an outer cover of the electronic device 1801. The important difference between a control cube for example at location 1806 and a known embedded joystick such as the one described in U.S. Pat. No. 5,541,622 is that the control cube of the present invention is accessible from at least two different sides, while in a known embedded joystick only the very end of the joystick is accessible on one side of the electronic device. Location 1808 is comparable to location 1806, but only offers a maximum of four accessible sides due to the triangular cross-section of the control "cube".

Depending on the physical implementation used for the control cube or control surfaces thereof, it is not inevitably easy to build in the detection of a rotation around what previously was designated as the Z-axis, if the control cube is not at an edge. FIG. 18 comprises a suggestion for an elegant solution to this problem, independently of the other physical implementation. The electronic device could comprise an additional control, which in FIG. 18 appears as a sliding switch 1809. It could also be a two-ended pressable key, or it could consist of two adjacent pressable keys, or it could be a turning knob or wheel. The additional control is located so that a human user can easily reach it with one finger of the hand that is holding the control cube or "virtual control cube" in a key pinch grip. For example with a control cube at location 1802 in FIG. 18 it would be most natural for a human user to hold his left thumb against the top surface of the control cube, his left middle finger against the bottom surface of the control cube and his left index finger on the sliding switch 1809. The control cube could then be used for all other movements than rotation around Z-axis, for which purpose the user would use the sliding switch 1809 in a very intuitive way. The sliding switch 1809 or any similarly used additional rotating control may physically be the same control that otherwise is used e.g. for volume control or some other purpose that is not often needed simultaneously with controlling graphically displayed objects. It is not mandatory to place the sliding switch 1809 or similar additional control to a different surface than any of the other control surfaces.

Figures 19A, 19B:
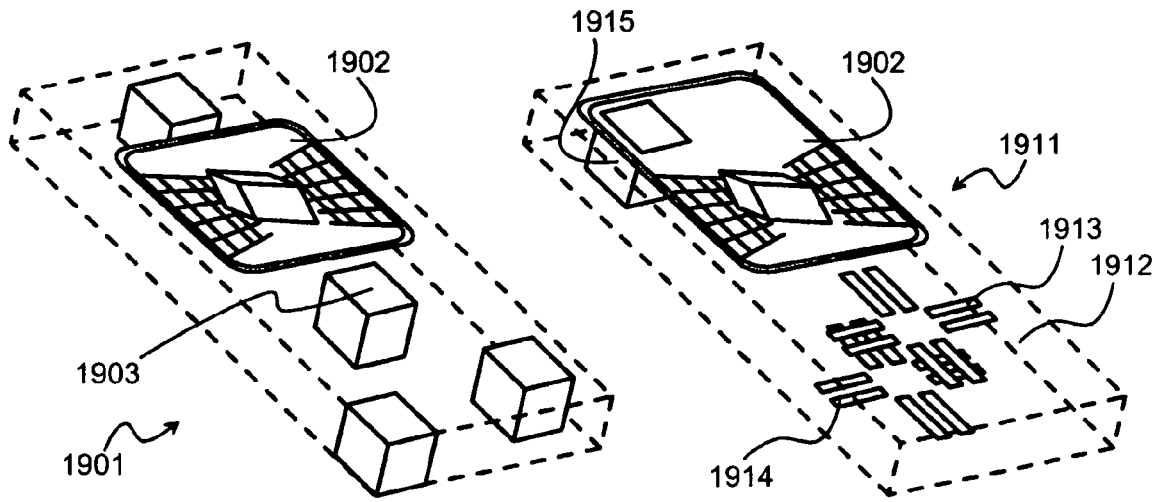
FIGS. 19a and 19b illustrate possible locations of a control cube or virtual control cube in another electronic device.

FIG. 19a illustrates some possible locations of a control cube or "virtual control cube" in an electronic device 1901 the form of which resembles more a conventional portable telephone. Immediately below a display 1902 at location 1903 is the most conventional location for a navigating control, but also other locations are possible, including edge and corner locations.

The key pinch grip inherently involves certain advantages that can be utilised in designing an electronic device and finding optimal locations for the control surfaces that constitute the control cube or "virtual control cube". When also other parts of the electronic device than just the control surfaces are within the user's hand, such other parts offer mechanical support against which the user's palm and/or other fingers may lean while his thumb and index or middle finger are manipulating the control surfaces. This, together with the fact that the key pinch grip also involves an at least gently pressing force against the control surfaces, allows the control surfaces to be designed with a very smooth outer appearance that matches the overall surface and outer appearance of the electronic device to produce a continuous, streamlined design.

FIG. 19b illustrates certain far-reaching alternatives in making the control surfaces match the overall appearance of an electronic device. According to the first alternative considered in FIG. 19b, the electronic device 1911 comprises an outer cover 1912, which is made of plastic or other material that is stiff enough to keep the electronic device in form but yet somewhat flexible, so that a human user may cause the outer cover 1912 to deform slightly in an elastic manner, by pressing and/or twisting certain parts of the outer cover. Strain gauging strips have been embedded into the material of the outer cover 1912. An arrangement of upper strain gauging strips 1913 is arranged to detect deformations of an upper part of the outer cover 1912 at a first location, and an arrangement of lower strain gauging strips 1914 is arranged to detect deformations of a lower part of the outer cover 1912 at a second location directly under the first location. Naturally also other detector types than strain gauging strips can be used, such as capacitive detectors, pressure-sensitive resistor or semiconductor foils and so on.

A second alternative illustrated in FIG. 19b is to use a touch-sensitive screen to implement at least one of the control surfaces. We may assume that the display 1902 is equipped with a touch-sensitive layer and thus constitutes a touch-sensitive screen, which as such represents known technology. According to an embodiment of the invention a "virtual control cube" is placed at location 1915 so that an upper control surface thereof is constituted by a part of said touch-sensitive screen, and a lower control surface is implemented with some other sensor technology, such as a miniature joystick or joypad, a touch pad, a multifunctional key or the like. The touch-sensitive screen used to implement the upper control surface does not need to be part of the main display of the device. There may also be an additional miniature display equipped with a touch-sensitive layer, which miniature display can be used e.g. to display instructions and/or visual effects related to the handling of the "virtual control cube".

In order to reduce the risk of a control surface being inadvertently manipulated e.g. during storage and transportation of an electronic device, it may be advantageous to place the control surface into a recess in the outer cover of the electronic device. Also in order to make it easier to manipulate a control surface with a fingertip it may be advantageous to make the control surface slightly concave in form and/or make its visible surface rough, rubbery or sticky.

The Control Algorithm and Automatic Mode Change

Figure 20A:
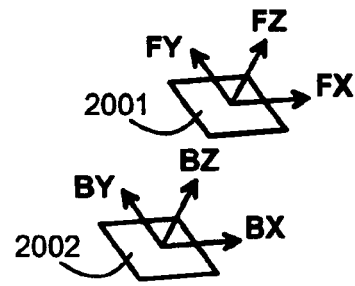
FIGS. 20a and 20b illustrate a control method based on the concept of a control cube or virtual control cube.

With control algorithm we mean the method of converting raw sensor data from the control surfaces into output values that can be fed into an application that is displaying graphics. We will first consider a simple situation where two control surfaces are used, and said control surfaces are not capable of detecting rotation around the Z-axis. We designate the control surfaces as the front control surface 2001 and the back control surface 2002. FIG. 20a illustrates a coordinate convention according to which the coordinate systems associated with a front 2001 and back 2002 control surfaces are identically oriented in space. We should underline that this coordinate convention means e.g. that from the viewpoint of the front control surface 2001 the positive Z-axis points out of the electronic device, while from the viewpoint of the back control surface 2002 the positive Z-axis points into the electronic device. Coordinate conventions like this are just notational tools, and different kinds of coordinate conventions could be used with their straightforward consequences in the other notations used in the following.

FX, FY and FZ mean an X-direction value, a Y-direction value and a Z-direction value respectively obtained from the front control surface. BX, BY and BZ mean an X-direction value, a Y-direction value and a Z-direction value respectively obtained from the back control surface. In an exemplary case where the control surface is the visible end of a miniature joystick or joypad, the X- and Y-direction values mean the signals that can be read from the detectors when the user bends the joystick or joypad to the X- or Y-direction respectively. The Z-direction value means the signal that can be read from the detectors when the user pushes or pulls the joystick or joypad in the Z-direction. In a multifunctional key solution the X- and Y-direction values mean the signals that can be read from the detectors when the user presses one edge of the multifunctional key, and the Z-direction value means the signal that can be read from the detectors when the user presses a middle part of the key or presses the whole key down. With other physical implementations the X-, Y- and Z-direction values can be similarly identified as the signals that can be read from the detectors when the user actuates the control in at least one of said directions.

X, Y and Z are output values meaning translatory movement in the X-, Y- and Z-directions respectively. A, B and C are output values meaning rotational movement around the X-, Y- and Z-directions respectively. The application will display the graphics in the X'-Y'-Z' coordinate system, so at the moment of being passed into the application the output values become to concern that coordinate system instead of the X-Y-Z coordinate system.

Operation begins at step 2010. Step 2011 means detecting, whether the user is actuating both control surfaces into the same direction on the X-axis, be it the positive or negative direction. A positive finding at step 2011 causes a translatory X direction output value to be calculated as the mean value of the FX and BX values according to step 2012. Step 2013 means detecting, whether the user is actuating both control surfaces into the same direction on the Y-axis, be it the positive or negative direction. A positive finding at step 2013 causes a translatory Y direction output value to be calculated as the mean value of the FY and BY values according to step 2014.

Step 2015 means detecting, whether the user is actuating the control surfaces in opposite directions on the X-axis. After a positive finding at step 2015 there follows an additional check at step 2016, which was the relative order of magnitude of the obtained FX and BX values. If FX was larger, the rotational output value B becomes the mean of the absolute values of FX and BX according to step 2017. If BX was larger, the rotational output value B becomes the opposite of the mean of the absolute values of FX and BX according to step 2018.

Step 2019 means detecting, whether the user is actuating the control surfaces in opposite directions on the Y-axis. After a positive finding at step 2019 there follows an additional check at step 2020, which was the relative order of magnitude of the obtained FY and BY values. If FY was larger, the rotational output value A becomes the mean of the absolute values of FY and BY according to step 2021. If BY was larger, the rotational output value B becomes the opposite of the mean of the absolute values of FY and BY according to step 2022.

At step 2023 the translatory Z direction output value is calculated as the sum of the obtained FZ and BZ values. Typically only one of these will be nonzero. Later in this description we will consider separately a situation where the user presses both control surfaces simultaneously (FZ<0 and BZ>0). Operation ends at step 2030.

Figure 20B:
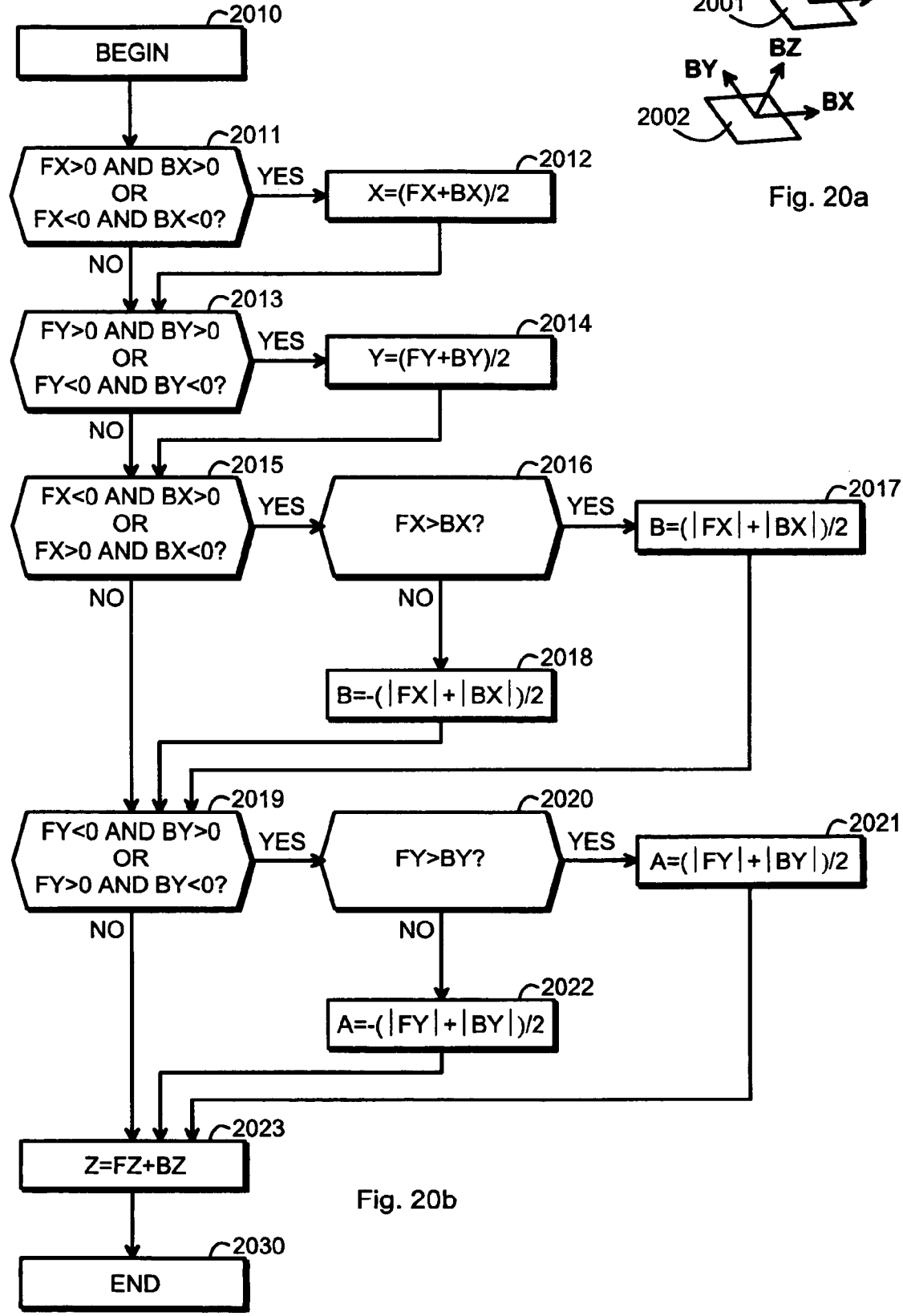
Figure 21A:
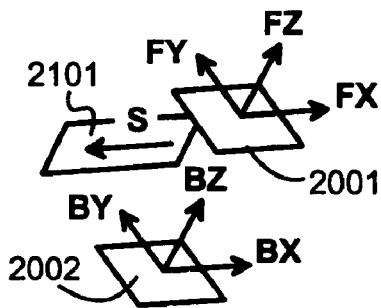
FIGS. 21a and 21b illustrate a possible alternative in the method of FIG. 20b, FIGS. 22a and 22b illustrate another possible alternative in the method of FIG. 20b, FIGS. 23a and 23b illustrate a concept of multiple control surfaces.
Figure 21B:
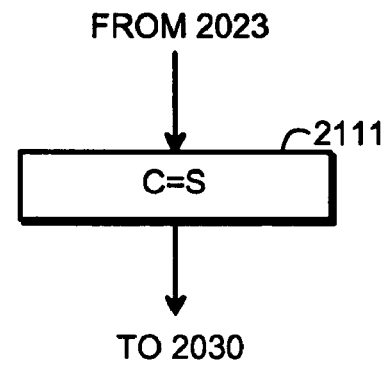

FIGS. 21a and 21b illustrate schematically a situation where the first 2001 and second 2002 control surfaces are augmented with a slide switch 2101 or some other separate input means for giving input signals that should be interpreted as commands for rotation around the Z-axis. S means the value obtained from the slide switch 2101. In the method of FIG. 20b the addition of a slide switch 2101 can be accounted for by simply adding a step 2111 between steps 2023 and 2030, in which step 2111 the rotational output value C is made equal to the obtained S value.

Figure 22A:
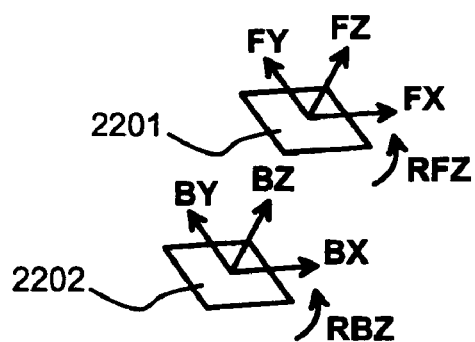
Figure 22B:
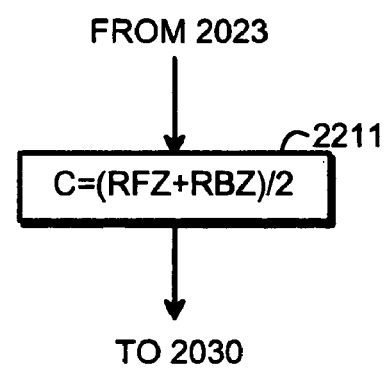

FIGS. 22a and 22b illustrate schematically a situation where the first and second control surfaces are themselves also capable of detecting user action that should be interpreted as commands for rotation around the Z-axis, justifying the different reference numbers 2201 and 2202. RFZ means the rotation-around-Z value obtained from the front control surface 2201 and RBZ means the rotation-around-Z value obtained from the back control surface 2202. In the method of FIG. 20b such capability of the control surfaces can be accounted for by simply adding a step 2211 between steps 2023 and 2030, in which step 2211 the rotational output value C is made equal to the mean of the obtained RFZ and RBZ values.

Figure 23A:
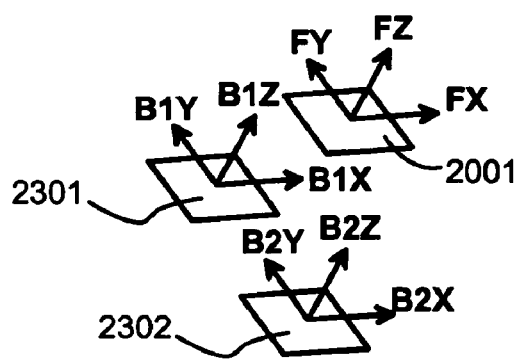
Figure 23B:
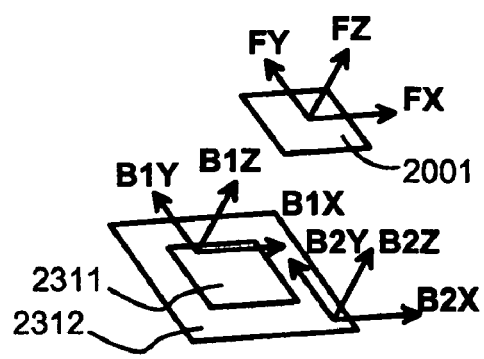

FIG. 23a illustrates schematically a situation where two conceptually different control cubes share one common control surface. The top or front control surface 2001 is to be manipulated with the user's thumb, while there are two different bottom or back control surfaces 2301 and 2302 to be manipulated with the index and middle fingers respectively or middle and ring fingers respectively. A control algorithm for an arrangement like that of FIG. 23a is easily produced by generalising from that of FIG. 20b, so that simultaneous operation of the front 2001 and first back control surface 2301 is taken to mean commands for moving a first graphically displayed object and that simultaneous operation of the front 2001 and second back control surface 2302 is taken to mean commands for moving a second graphically displayed object. FIG. 23b illustrates conceptually the same situation, however so that the first back control surface 2311 is located within an annular second back control surface 2312.

Even in simple solutions that only involve a single control cube, embodiments that comprise at least two independently responsive control surfaces, i.e. the so-called "virtual control cube" embodiments, allow automatic detection of whether a user is currently actuating only one control surface or at least two control surfaces. Such automatic detection can be further utilised for automatic mode change, which means that commands to a graphics-processing application are given in a slightly different way depending on the number of simultaneously actuated control surfaces. An exemplary automatic mode change is such where actuating two control surfaces simultaneously is interpreted to mean full three-dimensional control, while only actuating one control surface at a time is interpreted to mean that the user wants to "freeze" certain degrees of freedom and only cause a graphically displayed object to move in a limited number of ways.

Figure 24:
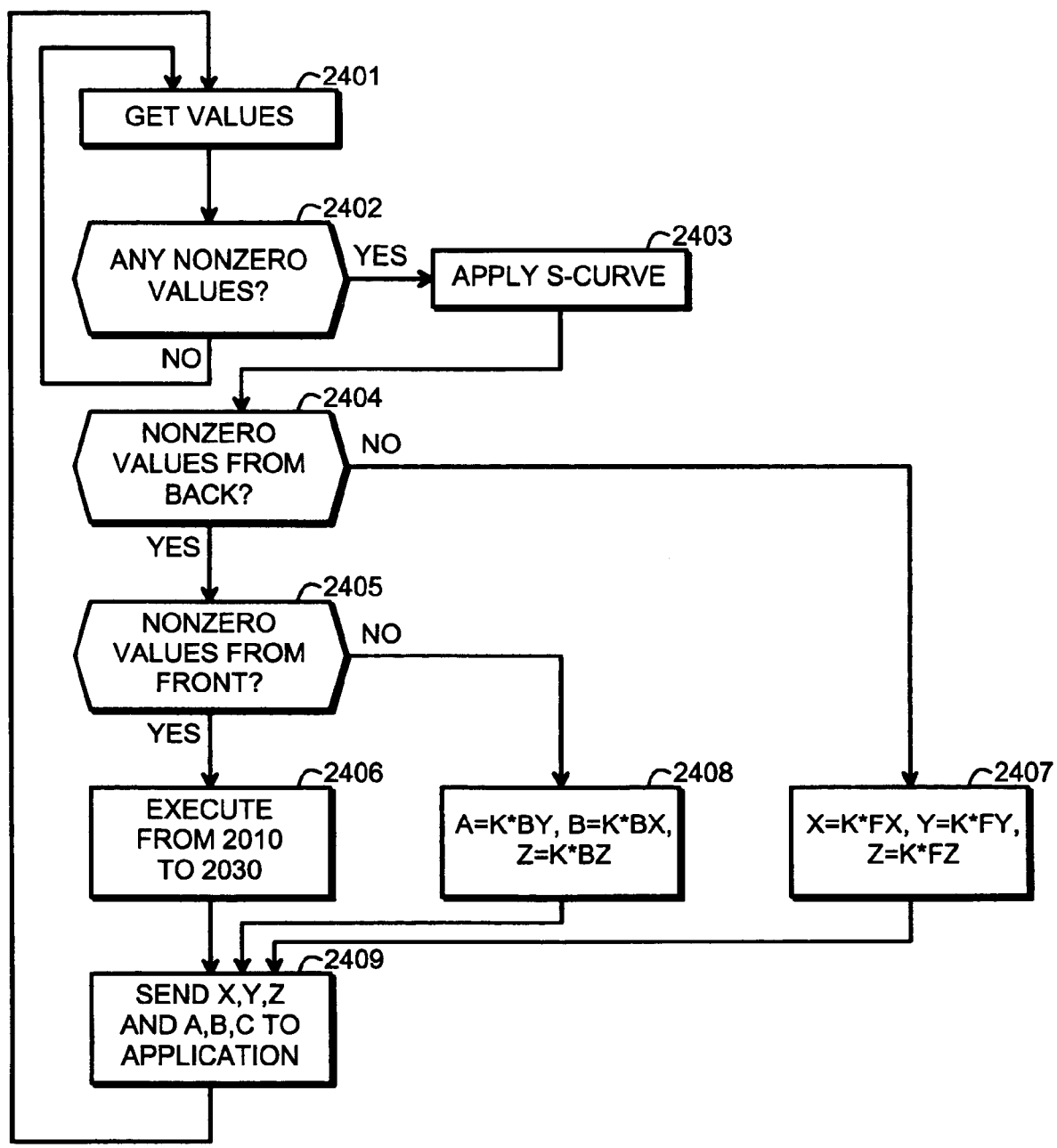
FIG. 24 illustrates another control method based on the concept of a control cube or virtual control cube.

FIG. 24 illustrates schematically a method for implementing an exemplary form of automatic mode change. As long as the user does not actuate any control surfaces at all, the method circulates in the loop consisting of steps 2401 and 2402. When certain values are obtained, indicating that the user has actuated at least one control surface, a transition to step 2403 occurs.

Applying an S-curve at step 2403 means mapping the obtained raw readings from the control surface sensors into modified values so that raw readings very close to zero give negligible or even pure zero modified values, and the proportionality factor between a raw reading and a modified value begins to increase with increasing absolute value of the raw reading. The purpose of applying an S-curve is to prevent unintentional creeping when the user does not mean to actuate a control surface at all, while simultaneously enabling even relatively strongly affecting commands. An S-curve may be parameterized so that a user can change its exact appearance to match his personal needs, or an application may change it dynamically for example according to a needed degree of control accuracy in a certain situation.

A nonlimiting example of mapping a raw reading N into a modified value M is to use $M=P*(1-\cos(T*N))$, in which P and T are real-valued proportionality constants selected so that for a largest possible raw reading Nmax, $T*Nmax$ is not larger than $\pi/2$ radians and $P*(1-\cos(T*Nmax))$ is of the order of magnitude of a largest reasonable command to the graphics-displaying application. A crude simplification of applying an S-curve is to map to zero all raw readings the absolute value of which is smaller than a certain limiting value Nlimit, and to use $M=(N-Nlimit)$ for all positive N larger than or equal to +Nlimit and $M=(N+Nlimit)$ for all negative N smaller than or equal to −Nlimit. Simpler yet, one could use M equal to a positive constant for all positive N larger than or equal to Nlimit and M equal to a negative constant for all negative N smaller than or equal to −Nlimit, and M equal to zero for all N between −Nlimit and +Nlimit.

Step 2404 corresponds to checking, whether the user did actuate a particular control surface, the exemplary designation of which is here the back control surface. If yes, there occurs a transition to step 2405 where a similar check is made to another control surface, the exemplary designation of which is here the front control surface. A positive finding even in step 2405 means that the user has actuated both control surfaces simultaneously, which causes the execution of the previously described routine between steps 2010 and 2030 in FIG. 20b, with the addition described in FIG. 21b or FIG. 22b if applicable.

If the finding at step 2404 was negative, the nonzero values that originally caused a transition from step 2402 to step 2403 had to come from the other (front) control surface. In the embodiment of FIG. 24 we assume that only actuating the front control surface means that the user wants to perform translatory movements on the graphically displayed object but not rotate it. Therefore at step 2407 the translatory movement output values X, Y and Z are given the values K*FX, K*FY and K*FZ respectively. The proportionality factor K can be freely selected by a designer of a practical embodiment of the method. It allows the automatic mode change to be combined with automatic fine tuning, so that in the "front control surface only" mode the graphically displayed object is moved more gradually than in the normal mode that involves actuating both control surfaces simultaneously.

A negative finding at step 2405 means that the nonzero values came from the back control surface. In the embodiment of FIG. 24 we assume that only actuating the back control surface means that the user wants to rotate the graphically displayed object but not move it rectilinearly. Therefore at step 2408 the rotational movement output values A and B are given the values K*BY and K*BX respectively. The proportionality factor K has the same role related to fine tuning as previously. Individually actuating only one control surface in the Z direction is not intuitively associated with any rotational movement, so step 2408 involves allowing movements in the Z-direction by Z=K*BZ. Any of steps 2407 or 2408, or both, can be augmented with one of the additional steps 2111 or 2211 for allowing rotation around the Z-axis, if the control surfaces and the electronic device have the required detection capability.

The automatic mode change means that the user does not need to do anything else than begin using the new mode; no explicit mode change commands are required. This is a remarkable advantage compared to all such previously known arrangements where the user had to manually freeze certain degrees of freedom or manually select the exact way in which the actuation of a mouse, a joystick or similar input device controlled the movements of graphically displayed objects. To help inexperienced users in understanding the procedure it may be good to display a graphical symbol of a full control mode, translatory motion only mode or rotational motion only mode when automatic mode change is or has been performed. For the principal idea of automatic mode change the exact selection of which way of actuating the control surfaces corresponds to which limited control mode is not important. For example steps 2407 and 2408 could easily be switched in FIG. 24. Also other limited control modes can be presented than the translatory motion only mode and rotational motion only mode described above.

For a squeezing movement of the user, i.e. pressing two parallel control surfaces towards each other, there is no intuitive corresponding movement of a graphically displayed object unless the application is e.g. a recreational game in which squeezing a selected object causes it to squirt "juice", "poison", "paint" or the like. However, embodiments that comprise at least two independently responsive control surfaces allow detecting such a squeezing movement easily (FZ<0 and BZ>0 in the coordinate systems of FIG. 20a). The control algorithm is easily augmented to include a step at which such a situation is detected, and some predefined output signal is given. The squeezing can be used e.g. in place of the more conventional "mouse click", for selecting and deselecting objects, pushing graphically displayed buttons and so on, or for manually triggering changes between control modes. The last-mentioned includes but is not limited to changing control resolution, i.e. selecting whether a certain move on the control corresponds to a small and fine-tuned or a large and fast movement of a graphically displayed object.

Many commonly used structures that are available for the physical implementation of the control surfaces allow also a magnitude of the squeezing movement to be detected, so it should be noted that despite of the "mouse click" example above, the squeezing movement does not need to serve only as a binary valued switch (squeeze/no squeeze) but can be used for magnitude-driven control just like the other ways of operating the control surfaces. One possible way of using a detected magnitude of squeezing in combination with other, simultaneously or otherwise detected control movements is such where a moving speed of a graphically displayed object is proportional to the magnitude of squeezing.

Functional Architecture

Figure 25:
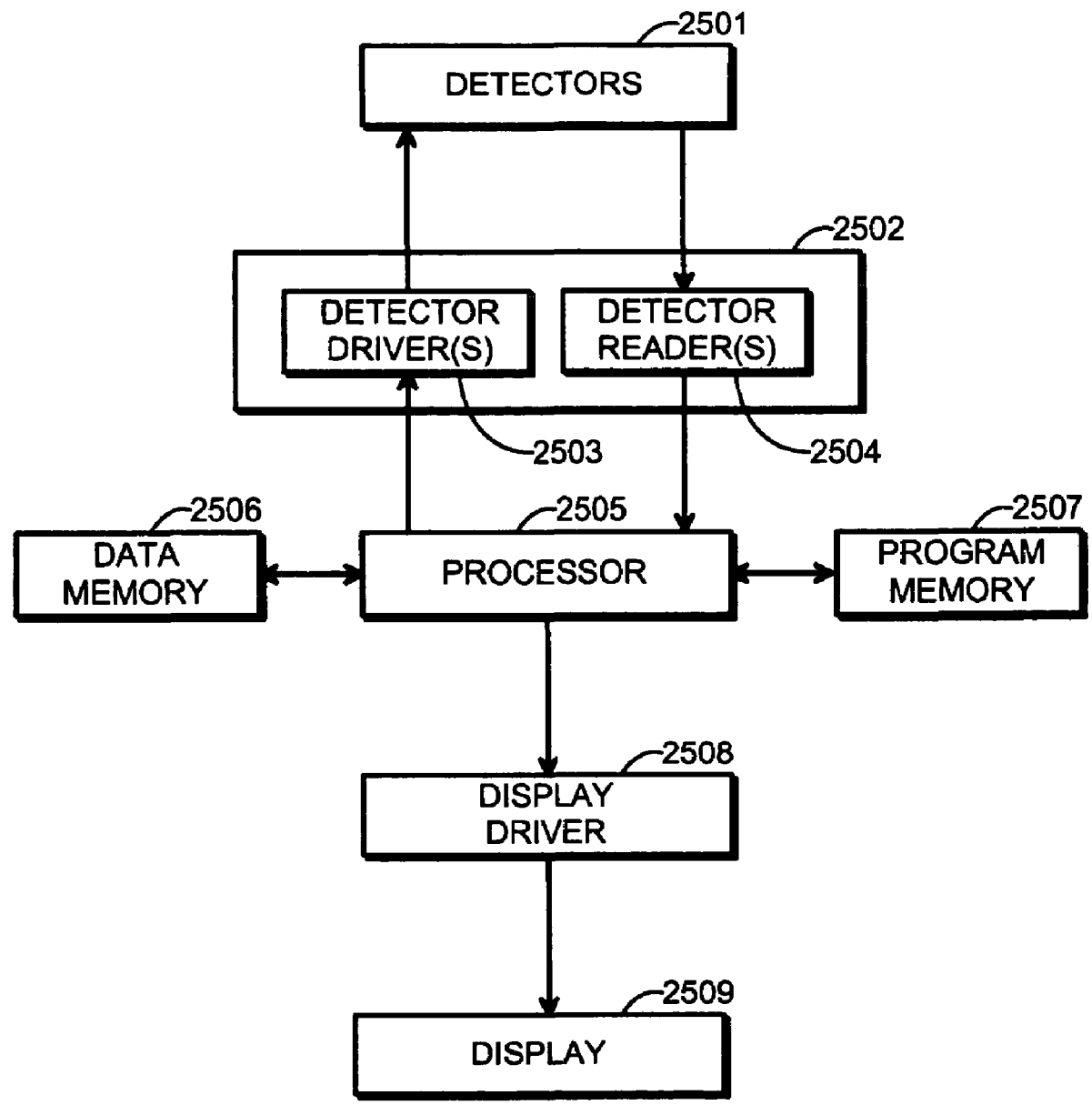
FIG. 25 illustrates a functional architecture of an electronic device.

FIG. 25 is a schematic block diagram of an electronic device adapted to utilize the control cube concept. Detectors 2501 are arranged to detect the way in which a user actuates the control surfaces of a control cube or "virtual control cube". The detectors as such represent known technology; the exact selection of detectors depends on the structure of the control cube or "virtual control cube" that is used. Examples of applicable detectors are widely known from prior art joystick, miniature joysticks, joypads, touch pads, multifunctional keys and the like. A detector interface block 2502 comprises the means for obtaining electric input signals from the detectors 2501. Typically such means include detector drivers 2503 used to feed input voltages to the detectors 2501, as well as detector readers 2504 that scan the detectors in order to obtain input signals caused by user action. The detector interface block 2502 may be based on technology known from prior art detector interfaces, but it must be versatile enough to accept input signals from all those detectors that are needed in the control cube or "virtual control cube" arrangement. For example, if a "virtual control cube" was built from simple miniature joysticks or joypads according to FIG. 13, the detector interface block 2502 may be essentially the combination of two such detector interface blocks that were used for a single prior art miniature joystick or joypad, augmented with multiplexing means that repeatedly sample the outputs of the two prior art detector readers and convey further the output signals so obtained in an organised manner.

A processor 2505 is adapted to receive the input signals from the detector interface block 2502. On one hand the processor 2505 runs operating system routines that take care of the reading of input signals; on the other hand it also runs an application, one purpose of which is to display graphics to a human user. To this end the processor is equipped with a data memory 2506 and a program memory 2507 in a way known as such. The methods described earlier in association with FIGS. 20b and 24 are essentially performed by the processor 2505, although some preprocessing features like the application of an S-curve may have been distributed even to the detector interface block 2502.

When the application executed in the processor 2505 produces information about graphics to be displayed, such information is passed on to a display driver 2508, which operates in a way known as such to display the corresponding graphic images in a display 2509.

Application to Various Control Purposes

Actuating at least two control surfaces that together constitute a control cube or a "virtual control cube" has its most advantageous uses in controlling the presentation of three-dimensional graphically displayed objects, due to the inherent intuitiveness of the concept. For the purpose of completeness it should be noted that other applications, such as controlling the presentation of two-dimensional graphically displayed objects, is not excluded. Especially embodiments with two independently responsive control surfaces allow separating their controlling functionalities altogether, like using one control surface for moving a cursor while simultaneously using another control surface for scrolling a large matrix of selectable alternatives.

In the world of three-dimensional graphics the control cube or "virtual control cube" concept can be applied to a large variety of purposes, including but not being limited to navigating around and moving objects in recreational games, manipulating a three-dimensional "virtual archive" where icons for files and programs are located in three-dimensional arrays, and moving drawing tools through a three-dimensional space in order to create new graphics.

The control cube or "virtual control cube" concept can even be applied to controlling the movements of real-world objects, if the movement commands are taken to servo motors rather than to a display driver. If the control is implemented in a portable telecommunication device, the communication capabilities of the device may be utilized to transmit the movement commands over arbitrarily long distances to arbitrary controllable systems.

What is claimed is:

1. A control, comprising:
   a first control surface,
   a second control surface, and
   a detector;
   said first control surface configured for manipulation with a thumb of one hand of a human user and configured for appearance on one side of a hand-held electronic device,
   said second control surface configured for manipulation with another finger of the same hand of the human user and configured for appearance on a second side of said hand-held electronic device, which second side is different than said first side, and
   said detector configured for jointly detecting how said first and second control surfaces are manipulated, and configured for conveying information about said detected joint manipulation of said first and second control surfaces for generation of control signals for a process displaying graphical objects in a display, said control signals being derived from said joint detection of how both the first and second control surfaces are manipulated and representing movements of a common graphical object in said display.

2. The control according to claim 1, wherein said first control surface and said second control surface are surfaces of a single mechanical entity.

3. The control according to claim 2, wherein said single mechanical entity is solid, and said detector is arranged to detect how said solid, single mechanical entity is moved in relation to a coordinate system defined by a body of a hand-held electronic device.

4. The control according to claim 3, wherein said single mechanical entity is full-boled from a rim of said first control surface to a rim of said second control surface.

5. The control according to claim 3, wherein said single mechanical entity comprises a first plate, a second plate and a shaft between said first and second plates, of which said shaft is narrower than any of said first and second plates in a direction perpendicular to a longitudinal axis of said shaft, and wherein said first control surface is a surface of said first plate, and wherein said second control surface is a surface of said second plate.

6. The control according to claim 2, wherein said single mechanical entity is solid and adapted to be isometrically fixed to a body of a hand-held electronic device, and said detector is arranged to detect forces exerted onto said solid, single mechanical entity in relation to a coordinate system defined by said body of said hand-held electronic device.

7. The control according to claim 2, wherein said single mechanical entity comprises a flexible portion, and said detector is arranged to detect how said flexible portion is deformed as a response to manipulating of said first and second control surfaces.

8. The control according to claim 1, comprising:
   a first mechanical entity, a surface of which is said first control surface, and
   a second mechanical entity, a surface of which is said second control surface; wherein said second mechanical entity is different than said first mechanical entity.

9. The control according to claim 8, comprising:
   a first detector layer on a surface of a support member,
   a first joystick supported adjacent to said first detector layer, which first joystick is said first mechanical entity and has an outer end pointing into a first direction,
   a second detector layer on a surface of a support member, and
   a second joystick supported adjacent to said second detector layer, which second joystick is said second mechanical entity and has an outer end pointing into a second direction, which is different than said first direction.

10. The control according to claim 9, wherein the first and second detector layers are disposed on a common support member.

11. The control according to claim 10, wherein said common support member is a printed wiring board having a first planar outer surface and a second planar outer surface, and wherein said first detector layer is disposed on said first planar outer surface and said second detector layer is disposed on said second planar outer surface.

12. The control according to claim 9, wherein the first and second detector layers are disposed on different support members.

13. The control according to claim 12, comprising a first printed wiring board having a first planar outer surface and a second printed wiring board having a second planar outer surface facing a different direction than said first planar outer surface of the first printed wiring board, wherein said first detector layer is disposed on said first planar outer surface and said second detector layer is disposed on said second planar outer surface.

14. The control according to claim 8, comprising:
   a first contact layer on a surface of a support member,
   a first multifunctional key supported adjacent to said first contact layer, which first multifunctional key is said first mechanical entity and comprises a number of actuators arranged to cause electric contact within said first contact layer as a response to pressing said first multifunctional key, and which first multifunctional key faces a first direction,
   a second contact layer on a surface of a support member, and
   a second multifunctional key supported adjacent to said second contact layer, which second multifunctional key is said second mechanical entity and comprises a number of actuators arranged to cause electric contact within said second contact layer as a response to pressing said second multifunctional key, and which second multifunctional key faces a second direction different than said first direction.

15. The control according to claim 14, wherein the first and second contact layers are disposed on a common support member.

16. The control according to claim 15, wherein said common support member is a printed wiring board having a first planar outer surface and a second planar outer surface, and wherein said first contact layer is disposed on said first planar outer surface and said second contact layer is disposed on said second planar outer surface.

17. The control according to claim 14, wherein the first and second contact layers are disposed on different support members.

18. The control according to claim 17, comprising a first printed wiring board having a first planar outer surface and a second printed wiring board having a second planar outer surface facing a different direction than said first planar outer surface of the first printed wiring board, wherein said first contact layer is disposed on said first planar outer surface and said second contact layer is disposed on said second planar outer surface.

19. The control according to claim 8, comprising:
a first touch pad on a surface of a support member, which first touch pad constitutes said first mechanical entity,
as a part of said first touch pad a first cover layer, an outer surface of which constitutes said first control surface, and which first cover layer faces a first direction,
a second touch pad on a surface of a support member, which second touch pad constitutes said second mechanical entity,
as a part of said second touch pad a second cover layer, an outer surface of which constitutes said second control surface, and which second cover layer faces a second direction different than said first direction.

20. The control according to claim 19, wherein at least one of said first touch pad and second touch pad is disposed on a display element, which together with a touch-sensitive layer thereupon constitutes a touch-sensitive screen.

21. The control according to claim 19, wherein the first and second touch pads are disposed on a common support member.

22. The control according to claim 21, wherein said common support member is a printed wiring board having a first planar outer surface and a second planar outer surface, and wherein said first touch pad is disposed on said first planar outer surface and said second touch is disposed on said second planar outer surface.

23. The control according to claim 19, wherein the first and second touch pads are disposed on different support members.

24. The control according to claim 23, comprising a first printed wiring board having a first planar outer surface and a second printed wiring board having a second planar outer surface facing a different direction than said first planar outer surface of the first printed wiring board, wherein said first touch pad is disposed on said first planar outer surface and said second touch pad is disposed on said second planar outer surface.

25. The control according to claim 1, comprising a third control surface, wherein:
said third control surface is adapted for manipulation with another finger of the same hand of the human user and adapted for appearance on a side of said hand-held electronic device, and
said detector is arranged to jointly detect how said first, second and third control surfaces are manipulated, and to convey information about detected manipulation of said first, second and third control surfaces further to generation of the control signals.

26. The control according to claim 1, additionally comprising a switch, wherein:
said switch is adapted for manipulation with another finger of the same hand of the human user and adapted for appearance on a side of said hand-held electronic device, and
said detector is arranged to jointly detect how said first and second control surfaces and said switch are manipulated, and to convey information about detected manipulation of said first and second control surfaces and said switch further to generation of the control signals.

27. A control, comprising:
first means for manipulation with a thumb of one hand of a human user and configured for appearance on one side of a hand-held electronic device,
second means for manipulation with another finger of the same hand of the human user and configured for appearance on a second side of said hand-held electronic device, which second side is different than said first side, and
means for jointly detecting how said first and second means for manipulation are manipulated, and configured for conveying information about said detected joint manipulation of said first and second means for manipulation for generation of control signals for a process displaying graphical objects in a display, said control signals being derived from said joint detection of how both the first and second control surfaces are manipulated and representing movements of a common graphical object in said display.

* * * * *